United States Patent [19]

Tsujimoto et al.

[11] Patent Number: 5,787,195
[45] Date of Patent: Jul. 28, 1998

[54] PRECISE DISCRIMINATION OF IMAGE TYPE

[75] Inventors: Takuya Tsujimoto; Masahiro Sakamoto, both of Toyko, Japan

[73] Assignee: Canon Kabushiki Kaisha, Japan

[21] Appl. No.: 760,330

[22] Filed: Dec. 5, 1996

Related U.S. Application Data

[63] Continuation of Ser. No. 318,287, Oct. 5, 1994, abandoned.

[30] Foreign Application Priority Data

Oct. 20, 1993 [JP] Japan ................... 5-262528

[51] Int. Cl.$^6$ ............... H04N 1/405; H04N 1/407
[52] U.S. Cl. ............... 382/176; 382/292; 358/462; 358/464; 358/426
[58] Field of Search ............... 358/426, 453, 358/456, 461–464; 382/176, 257, 266, 290, 292, 282, 251, 250; 348/405, 417, 418; H04N 1/405, 1/407

[56] References Cited

U.S. PATENT DOCUMENTS

| | | | |
|---|---|---|---|
| 4,668,995 | 5/1987 | Chen et al. | 358/462 |
| 5,001,576 | 3/1991 | Tanaka et al. | 358/462 |
| 5,075,788 | 12/1991 | Funada | 358/462 |
| 5,109,436 | 4/1992 | Machida et al. | 358/462 |
| 5,121,447 | 6/1992 | Tanioka et al. | 358/464 |
| 5,231,482 | 7/1993 | Murakami et al. | 358/500 |
| 5,278,919 | 1/1994 | Sugiura et al. | 358/462 |
| 5,317,419 | 5/1994 | Koizumi | 358/462 |
| 5,371,610 | 12/1994 | Sugawa | 358/453 |
| 5,418,626 | 5/1995 | Semasa | 358/455 |
| 5,517,327 | 5/1996 | Nakatani et al. | |
| 5,535,013 | 7/1996 | Murata | 358/462 |

FOREIGN PATENT DOCUMENTS

| | | |
|---|---|---|
| 0501450 | 9/1992 | European Pat. Off. |
| 0527488 | 2/1993 | European Pat. Off. |

OTHER PUBLICATIONS

Yoshida et al., "Bi–level Rendition of Images Containing Text, Screened Halftone and Continuous Tone," IEEE Global Telecommunications Conference *Globecom* '91, Dec. 1991, vol. 1, pp. 3.7.1–3.7.6.

*Primary Examiner*—Kim Yen Vu
*Attorney, Agent, or Firm*—Fitzpatrick, Cella, Harper & Scinto

[57] ABSTRACT

An image processing apparatus having: an input unit for inputting image data; a unit for producing a plurality of parameters from a region consisting of data for the input object pixel and peripheral pixels; and a discriminating unit for discriminating to what extent the region preferably, just the object pixel is to be regarded as character image or halftone image, in accordance with correlation of the plurality of parameters.

50 Claims, 20 Drawing Sheets

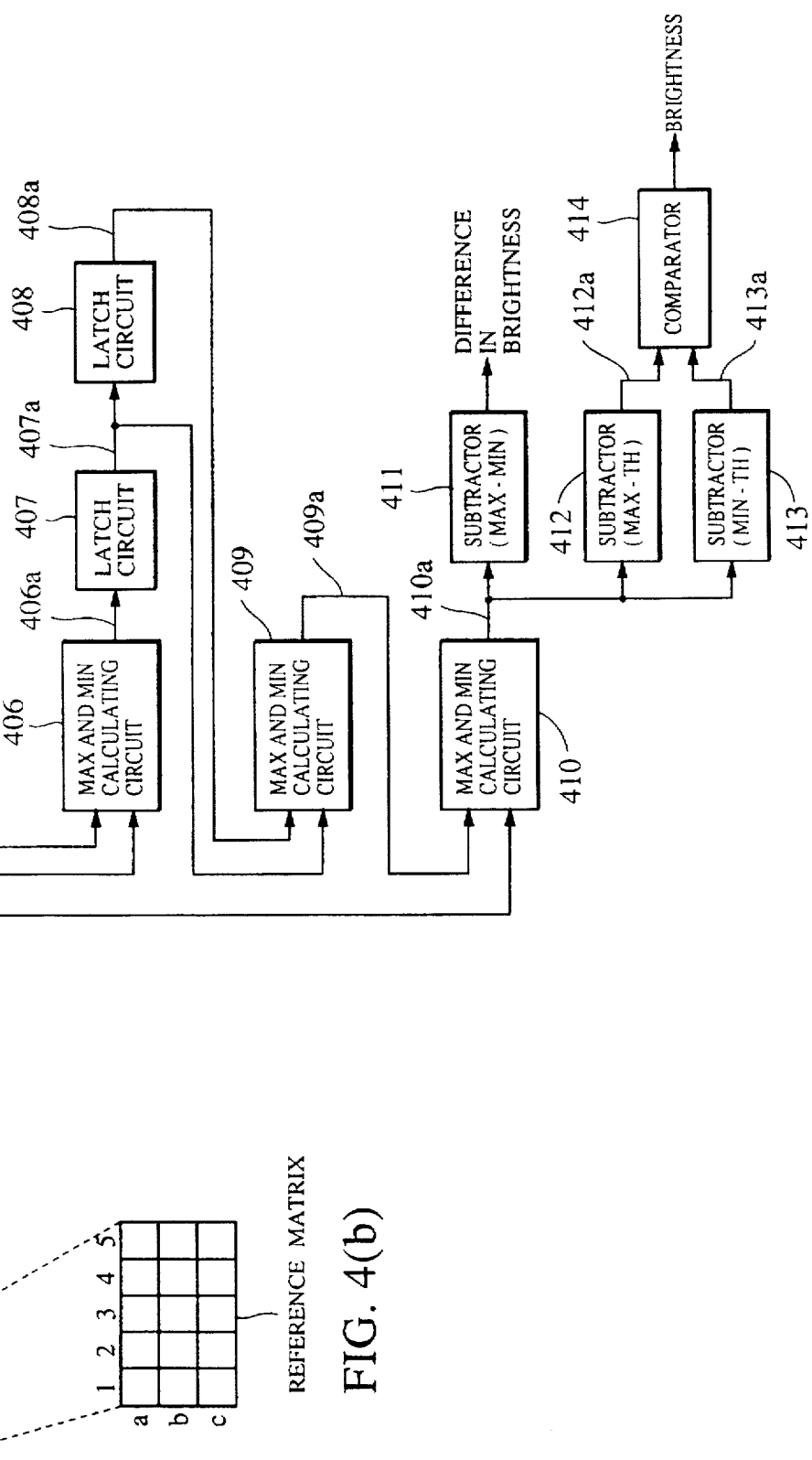
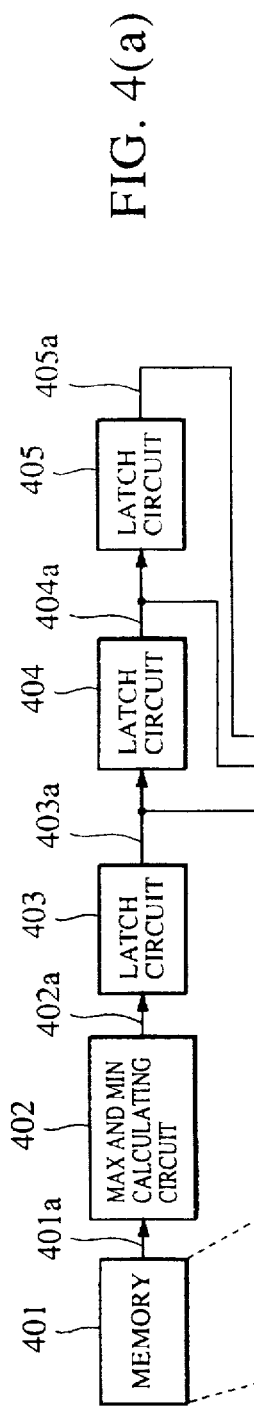

* : PIXEL OF INTEREST

FIG. 11
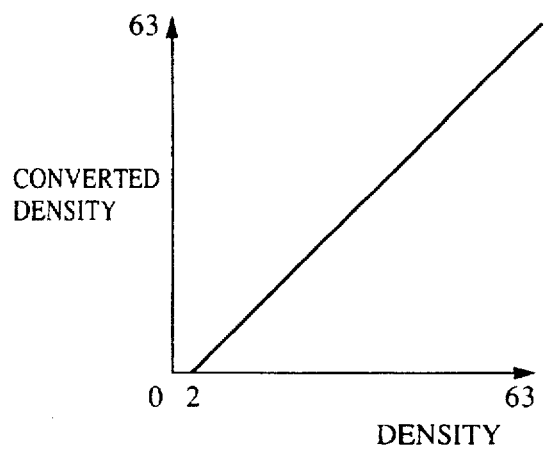
FIG. 11
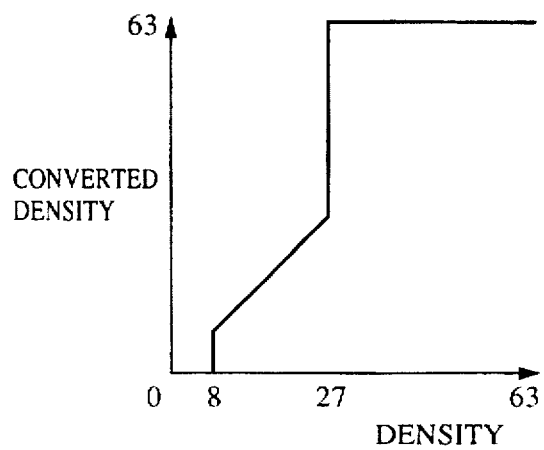
FIG. 11
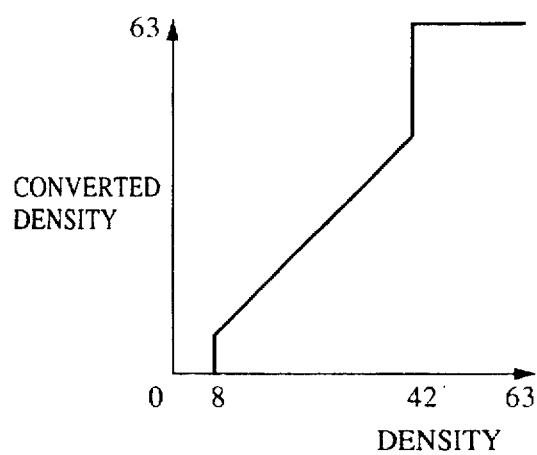
FIG. 11
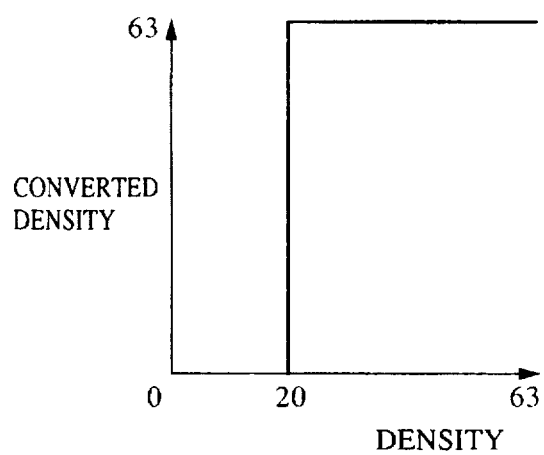
FIG. 11
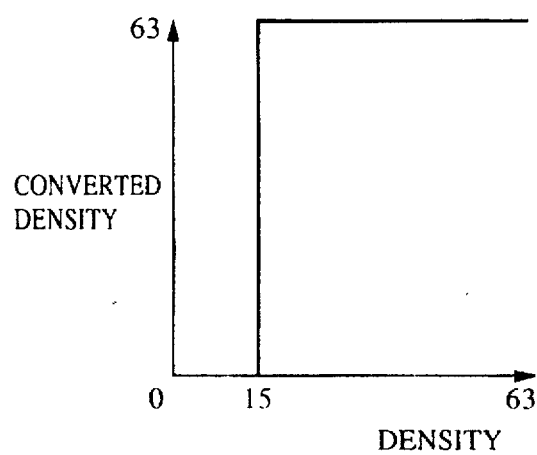
FIG. 11
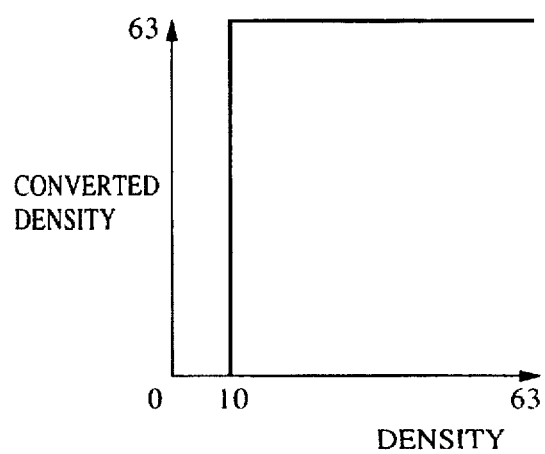

∗ : PIXEL OF INTEREST

|   | ∗ | 2/6 |
|---|---|---|
| 1/6 | 2/6 | 1/6 |

1401

|   | ∗ | 2 |
|---|---|---|
| 1 | 2 | 1 |

1404    ∗ : PIXEL OF INTEREST

|   | ∗ | 2/12 |
|---|---|---|
| 1/12 | 2/12 | 1/12 |

1402

| ∗ | 1 |
|---|---|
| 1 |   |

1405

|   | ∗ | 0 |
|---|---|---|
| 0 | 0 | 0 |

1403

| ∗ |
|---|

1406

PRECISE DISCRIMINATION OF IMAGE TYPE

This application is a continuation of application Ser. No. 08/318,287 filed Oct. 5, 1994, now abandoned.

BACKGROUND OF THE INVENTION

1. Field of the Invention

The present invention relates to an image processing apparatus and a method therefor that quantize image data, and more particularly to an image processing apparatus and a method therefor that discriminate an image type attribute for each pixel from an image having characters and halftone images mixed together.

2. Related Background Art

At present, an original document can satisfactorily be reproduced in a digital copying machine, a digital facsimile machine or the like by employing a fixed threshold method for a character document and an error diffusion method for a halftone image, such as a photograph, selection between which can be made using external keys. In the foregoing case, there arises a problem in that the selection operation is too complicated. What is worse, an excellent image cannot be obtained from an original document including both characters and photographs, mixed together, by either of the foregoing methods.

Accordingly, a method has sometimes been employed which uses an image region separation means that automatically discriminates character regions and photograph regions in the original document to select a processing method. The image has been identified in such a manner that the difference in brightness (the difference between the maximum value and the minimum value in a reference area including a pixel of interest) is used as a parameter to be subjected to a comparison with a certain fixed threshold, character regions and photograph regions being discriminated on the basis of this comparison.

However, the method using the difference in the brightness as the parameter and performing the discrimination in such a manner that regions of a type having a small difference in the brightness are discriminated to be photograph regions and regions of a type having a large difference are discriminated to be character regions, can sometimes lead to the unsatisfactory result that background portions and full-black portions are discriminated to be photograph regions. As a result, dot-like noise will be generated in those regions. In order to prevent the generation of noise in background portions and full-black portions, it might be feasible to employ a method in which background portions (white portions) and black portions are identified and are subjected to a threshold process which prevents the dot-like nozzle. However, in the case where only the difference in the brightness is used as a parameter to discriminate the regions by type, gray regions having substantially no change in the brightness between the background portions and the darkest portions thereof are discriminated to have the same attribute. As a result, there arises a second problem in that also the gray regions having substantially no brightness change are subjected to the threshold process for preventing the generation of noise and, as a result, are not accurately reproduced. What is worse, the method in which the different processing methods are employed for respective regions makes the control of the processes too complicated.

SUMMARY OF THE INVENTION

Accordingly, an object of the present invention is to provide an image processing method and an apparatus therefor that use a plurality of parameters, and in which the attribute of an image is discriminated in accordance with the correlation of the parameters to discriminate the degree of a character image and a halftone image as well as discriminating that the image is a character image or a halftone image, so that a more precise discrimination is made possible.

Another object of the present invention is to provide an image processing method and an apparatus therefor that use a plurality of parameters, in which the attribute of an image is discriminated in accordance with the correlation of the parameters to enable a more precise discrimination to be performed, and in which image data is quantized after being converted in accordance with the result of the discrimination, to obtain a high quality image accurately reflecting the attribute of supplied image data.

Another object of the present invention is to provide an image processing method and an apparatus therefor having an arrangement such that image data is converted in accordance with the result of discrimination of the attribute and the converted image data is quantized so that quantization can be performed by the same method in all cases, that is, eliminating a necessity of changing the quantizing method depending upon the attribute, so as to simplify the structure and prevent generation of a discontinuous image due to switching between different quantizing methods.

Another object of the present invention is to provide an image processing method and an apparatus therefor that use a plurality of parameters and in which the attribute of an image is discriminated in accordance with the correlation of the parameters to perform a more precise discrimination and the quantizing parameter for use at a quantizing process adapted to accurately correspond to the result of the discrimination is changed so as to obtain a high quality image in accordance with the attribute of the supplied image data while using a simple structure in which the quantizing parameter is changed.

Another object of the present invention is to provide an image processing method and an apparatus therefor having an arrangement such that the attribute is discriminated in accordance with the correlation of a plurality of parameters and output data is obtained in accordance with the result of the discrimination so that high quality output data is obtained without performing a complicated selection operation.

Another object of the present invention is to provide an image processing method and an apparatus therefor that precisely discriminate the attribute of image data and obtain output data in accordance with the result of the discrimination so that generation of dot-like noise and wanting of thin lines are prevented.

Another object of the present invention is to provide an image processing method and an apparatus therefor capable of clearly reproducing light characters.

Other and further objects, features and advantages of the invention will be appear more fully from the following description.

BRIEF DESCRIPTION OF THE DRAWINGS

FIGS. 4 (a) and 4 (b) illustrate a parameter extracting portion for discriminating the attribute;

FIGS. 11 [1] through 11 [6] are graphs showing the correspondence of a density correction table;

DESCRIPTION OF THE PREFERRED EMBODIMENTS

First Embodiment

One embodiment of the present invention will now be described with reference to the drawings.

Figure 1:
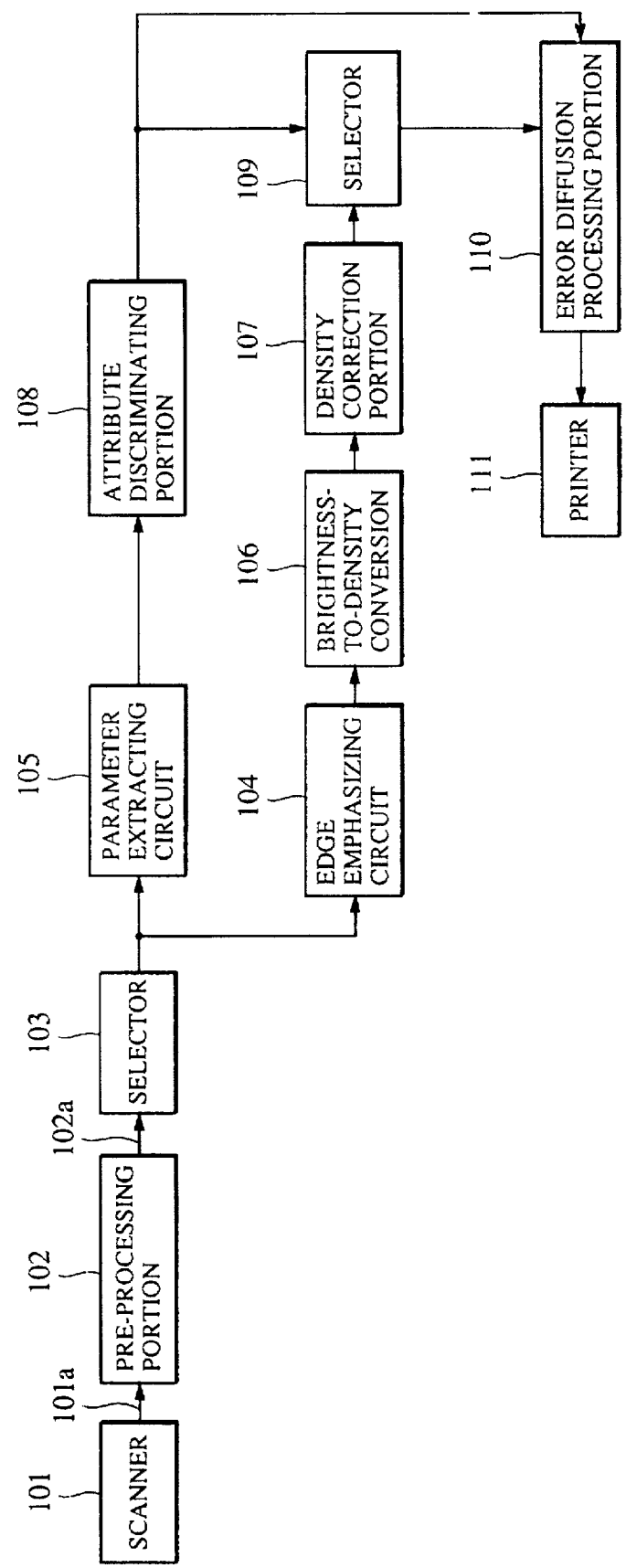
FIG. 1 is a block diagram which illustrates an image processing apparatus according to a first embodiment of the present invention.

FIG. 1 is a block diagram which illustrates an image processing apparatus according to an embodiment of the present invention.

Referring to FIG. 1, reference numeral 101 represents a scanner for reading an original document, the scanner 101 comprising a CCD (Charge-Coupled Image Device) or a CS (Contact Sensor). Reference numeral 101a represents an analog video signal transmitted from the scanner 101.

Reference numeral 102 represents a pre-processing portion for pre-processing the analog video signal 101a. The process to be performed by the pre-processing portion 102 will be described later. Reference numeral 102a represents quantized multi-value brightness data represented by 6 bits for each pixel by the pre-processing portion 102.

Reference numeral 103 represents a selector for controlling flow of image signals.

Reference numeral 104 represents an edge emphasizing circuit for sharpening the image. The edge emphasizing circuit 104 performs the edge emphasizing process in order to improve the resolutions in the main scanning direction and the sub-scanning direction and in such a manner that a 3×3 Laplacian filter equivalent to a secondary differentiation operation is used to calculate the quantity of edges of the pixel of interest to obtain a product with the edge emphasizing gain, and the product is added to the pixel of interest. Since the Laplacian filter also emphasizes noise, which of course is not original image information, and therefore deteriorates the image quality, the process of adding the edge quantity to the pixel of interest, that is, the edge emphasizing process, is not performed in a case where the edge quantity is smaller than a certain fixed threshold. This feature leads to the prevention of roughness of a halftone portion in a uniform density portion.

Reference numeral 105 represents a parameter extracting circuit for extracting the parameter with which the attribute is discriminated by obtaining the maximum and minimum values from brightness data of a plurality of pixels in a reference matrix constituted by a plurality of pixels; the difference in brightness and the brightness itself, which are the parameters for discriminating the attribute, are obtained in a manner to be described later.

Reference numeral 106 represents a brightness-to-density conversion portion for converting brightness data to density data, the brightness-to-density conversion portion 106 being composed of a conversion table comprising a ROM or a RAM. The brightness signal received by and the density signal transmitted from the brightness-to-density conversion portion 106 are 6-bit data.

Reference numeral 107 represents a density correction portion for correcting density data converted by the brightness-to-density conversion portion 106, the density correction portion 107 being composed of a plurality of correction tables. The correction tables include a plurality of tables, such as a table for expressing binary-coding with a fixed threshold, of a type adaptable to the attributes of pixels. The density signal received by and the output signal from the density correction portion 107 are 6-bit data items. Each table in portion 107 can comprise a ROM or a RAM.

Reference numeral 108 represents an attribute discriminating portion for discriminating the attribute from the parameter obtained in the parameter extracting circuit 105. The attribute discriminating portion 108 receiving the parameter uses 6 bits as an address signal. Thus, the attribute discriminating portion 108 provides a signal for selecting one data item from a plurality of data items the density of which has been corrected by the density correction portion 107, a signal for changing the shape of an error diffusion matrix for use in the binary-coding process to be performed when the error diffusion method, to be described later, is performed, and a signal for changing the weighting coefficient of the error diffusion matrix. The attribute discriminating portion 108 is composed preferably of a look-up table, such as a ROM or a RAM.

Reference numeral 109 represents a selector for selecting one data item the density of which has been converted to a desired level, in response to a select signal representing the result of the attribute discrimination performed in the attribute discriminating portion 108, from among the density data items corrected by the density correction portion 107.

Reference numeral 110 represents an error diffusion processing portion for quantizing the multi-value data selected by the selector 109 into binary-coded data in a manner to be described later.

Reference numeral 111 represents a printer for recording an image in accordance with binary-coded data supplied from the error diffusion processing portion 110, the printer being usually a thermal transfer, a laser beam or ink jet printer.

Figure 2:
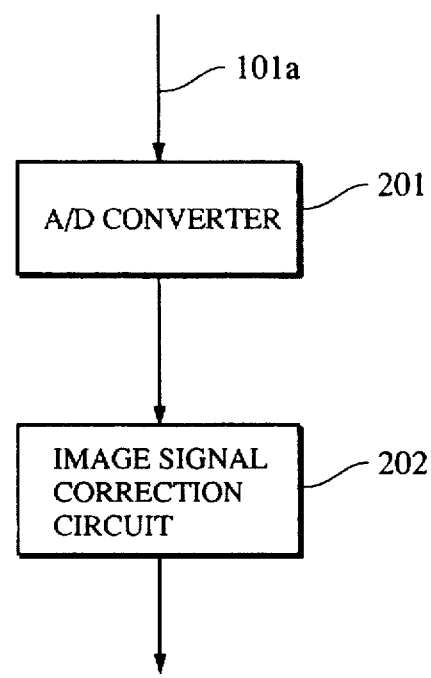
FIG. 2 is a block diagram which illustrates a pre-processing portion 102 shown in FIG. 1.

FIG. 2 is an internal structural view which illustrates in detail the pre-processing portion 102 shown in FIG. 1.

Initially, the analog video signal 101a, which is analog image data read by the scanner 101, is quantized into 6-bit digital image data by an A/D converter 201. Note that the digital image data is brightness data. The number of scale levels is 64 including data having the lowest brightness, which represents black (full black), and the brightest data, which represents full white.

Brightness data transmitted from the A/D converter 201 is subjected, by an image signal correction circuit 202, to processing for correcting for irregular sensitivity of the CCD or the CS of the scanner 101 and for shading distortion (the distortion of the light distribution characteristic of the particular light source used.

Figure 3:
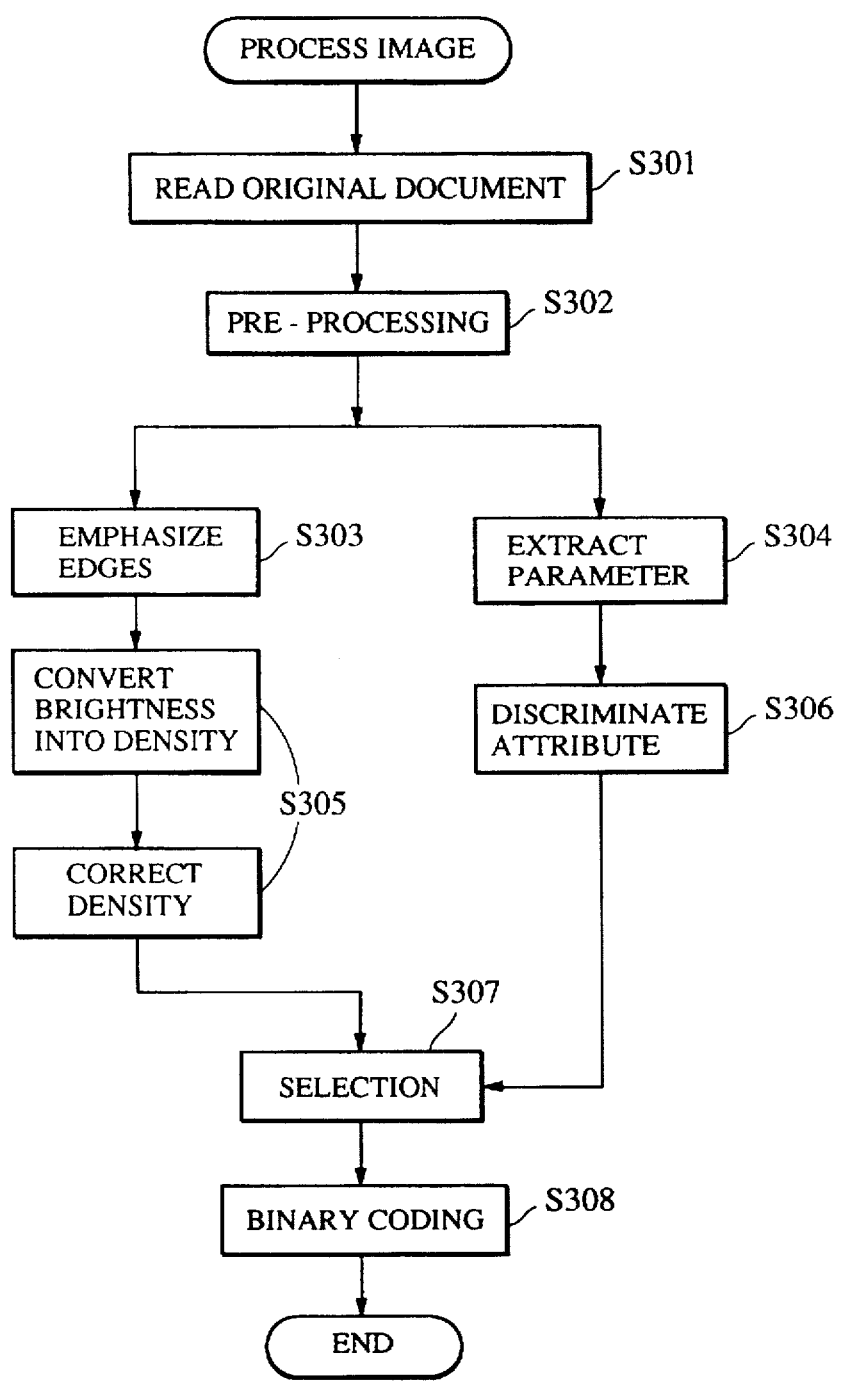
FIG. 3 is a flow chart of a process to be performed by the image processing apparatus according to the first embodiment.

FIG. 3 is a flow chart which illustrates the process to be performed by the image processing apparatus according to this embodiment.

Initially, in step S301, the process of reading the original document is performed by the scanner 101. The analog video signal 101a read by the scanner 101 is transmitted to the pre-processing portion 102. In step S302, the pre-processing portion 102 performs the predetermined process to quantize the analog video signal 102a into 6-bit digital image data as shown in FIG. 2. The digital image data is the brightness data 102a which is transmitted to the selector 103 before being transmitted to the edge emphasizing circuit 104 and the parameter extracting circuit 105. In step S303 the edge emphasizing circuit 104 performs the edge emphasizing process in such a manner that the edge emphasizing circuit 104 emphasizes the edges of the image, to transmit edge-emphasized data to the brightness-to-density conversion portion 106. In step S304 the parameter extracting circuit 105 performs the parameter extracting process to obtain the parameter and provides it to the attribute discriminating portion 108. In step S305 the brightness-to-density conversion portion 106 and the density correction portion 107 perform their respective conversion processes. In the brightness-to-density conversion portion 106, the brightness data subjected to the edge emphasizing process in step S303 is subjected to the brightness-to-density conversion, and then the converted density data is subjected to the density correction in the density correction portion 107. In step S306 the attribute discriminating portion 108 discriminates the attribute in accordance with the parameter obtained in the parameter extracting process for discriminating the attribute (performed in step S304). In step S307 the selector 109 performs the selection process, selecting one from among the plural density data converted in step S305, in accordance with the result of the attribute discrimination performed in step S306 and transmitting the selected data to the error diffusion processing portion 110. The structure of hardware for discriminating the attribute to be performed in step S306 will be described later. Finally, in step S308 the error diffusion processing portion 110 performs the binary-coding process using the error diffusion method.

FIG. 4 (a) is a diagram which illustrates the parameter extracting circuit 105 shown in FIG. 1.

Reference numeral 401 represents a memory for storing brightness data with which the attribute is discriminated. As shown in FIG. 4 (b), numerals and symbols are given to the pixels as labels corresponding to positions in the reference matrices. The numerals represent columns, while the letters represent rows.

Reference numeral 401a represents brightness data for one column, that is, brightness data for three pixels in this case.

Reference numeral 402 represents a maximum value and minimum value calculating circuit for obtaining the maximum value and the minimum value from the supplied brightness data 401a for the three pixels. The maximum value and minimum value calculating circuit 402 will be described later. Reference numeral 402a represents a brightness signal representing the maximum value and the minimum value from among the three pixels.

Reference numerals 403, 404 and 405 represent latch circuits in which the maximum value and the minimum value for each column obtained by the maximum value and minimum value calculating circuit 402 can be obtained for three columns. Reference numerals 403a, 404a and 405a represent brightness signals of the maximum value and the minimum value for each column, the brightness signals corresponding respectively to the fifth, fourth and third columns in the reference matrix.

Reference numeral 406 represents a maximum value and minimum value calculating circuit for obtaining the maximum value and the minimum value from among the maximum values and the minimum values of two forward columns (the third and fourth columns) of the columns latched by the forward latch circuits 404 and 405. The maximum value and minimum value calculating circuit 406 will be described later. Reference numeral 406a represents brightness data representing the maximum value and the minimum value from among the pixels (6 pixels) for two columns.

Reference numerals 407 and 408 represent latch circuits which are capable of latching data representing the maximum value and the minimum value of two further forward columns by performing latching two times. Reference numeral 407a represents brightness data representing the maximum value and the minimum value of the second column and the third column. Reference numeral 408a represents brightness data representing the maximum value and the minimum value of the first column and the second column.

Reference numeral 409 represents a maximum value and minimum value calculating circuit for obtaining the maximum value and the minimum value from among the maximum values and minimum values of the two forward columns (the first column and the second column) and the two rear columns (the third columns and the fourth columns) latched by the latch circuits 407 and 408. The maximum value and minimum value calculating circuit 409 will be described later. Reference numeral 409a represents brightness data representing the maximum value and the minimum value from among the pixels (12 pixels) for four columns.

Reference numeral 410 represents a maximum value and minimum value calculating circuit for obtaining the maximum value and the minimum value of pixels for five columns, that is, the pixels in the reference matrix among the maximum values and the minimum values of the four forward columns (the first column to the fourth column) obtained by the maximum value and minimum value calculating circuit 409 and one rear column (the fifth column) latched by the latch circuit 403. The maximum value and minimum value calculating circuit 410 will be described later. Reference numeral 410a represents brightness data representing the maximum value and the minimum value in the reference matrix.

Reference numeral 411 represents a subtractor for calculating the difference in brightness, which is the parameter, from the difference between the maximum value and the minimum value in the reference matrix obtained by the maximum value and minimum value calculating circuit 410.

Reference numeral 412 represents a subtractor for subtracting a fixed threshold from the maximum value obtained by the maximum value and minimum value calculating circuit 410. Reference numeral 412a represents a difference between the maximum value and the fixed threshold.

Reference numeral 413 represents a subtractor for subtracting a fixed threshold from the minimum value obtained by the maximum value and minimum value calculating circuit 410. Reference numeral 413a represents a difference between the minimum value and the fixed threshold.

Reference numeral 414 represents a comparator for obtaining the brightness parameter, which is the larger value (412a or 413a); that is, the absolute value of the difference 412a between the maximum value and the fixed threshold or the absolute value of the difference 413a between the minimum value and the fixed threshold.

Note that the fixed threshold is given reference numeral 32. A structure may be employed in which the threshold is made to be variable, to obtain an output image having a desired gray scale.

The two parameters to be obtained here are the difference in brightness (maximum brightness minus minimum brightness) and the brightness.

The difference in brightness represents the difference between the maximum value and the minimum value of the level of the brightness data in the reference matrix.

The brightness parameter will now be described. The absolute value of the difference between the maximum value of the level of brightness data in the reference matrix and the fixed threshold, and the absolute value of the minimum value and the fixed threshold, are subjected to a comparison. If the difference from the maximum value is larger, the value obtained by subtracting the fixed threshold from the maximum value is employed as the brightness. If the difference from the minimum value is larger, the value obtained by subtracting the fixed threshold from the minimum value is employed as the brightness. That is, the brightness parameter is simply the value farther from the threshold.

Figure 5:
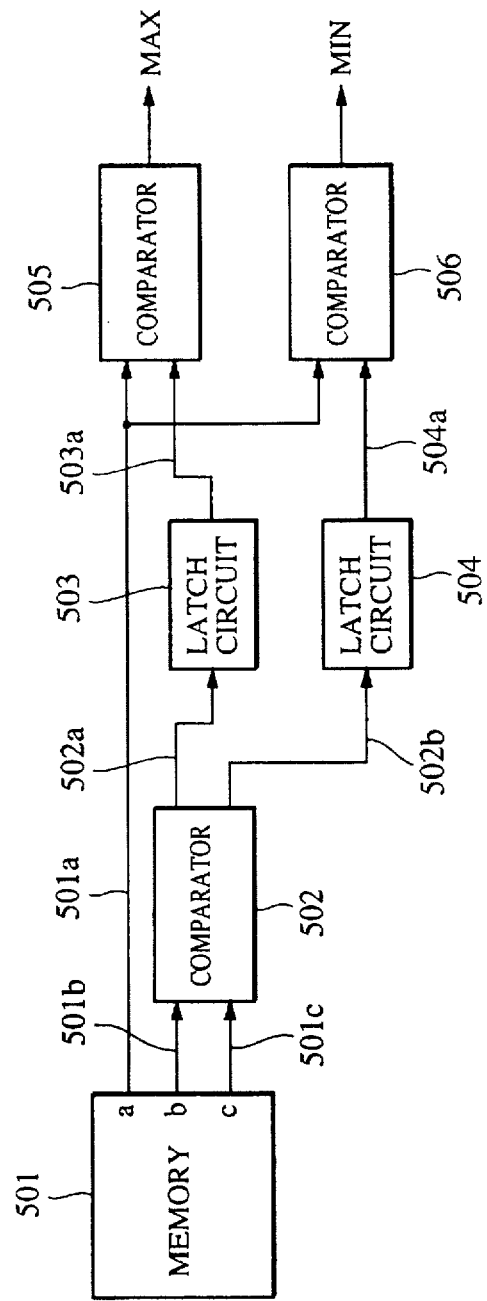
FIG. 5 is a block diagram which illustrates a circuit for calculating the maximum value and the minimum value from one column (three pixels) of a reference matrix.

FIG. 5 illustrates a circuit for obtaining the maximum value and the minimum value from pixels (three pixels) for one column in the reference matrix.

Reference numeral 501 represents a memory for storing brightness data with which the attribute is discriminated.

Reference numeral 502 represents a comparator for subjecting the brightness of pixel b and pixel c to a comparison by using brightness data 501b and 501c stored in the memory 501. Reference numerals 502a and 502b represent larger brightness data and smaller brightness data, respectively.

Reference numerals 503 and 504 represent latch circuits. Reference numerals 503a and 504a represent larger brightness data and smaller brightness data of the two pixels.

Reference numeral 505 represents a comparator for subjecting to a comparison, brightness data 503a of either the pixel b or pixel c that is determined to be brighter and brightness data 501a of pixel a stored in the memory 501. The comparator 505 is in the form of a circuit for selecting the larger value, that is, the pixel having the largest brightness data among the three pixels, as the maximum value.

Reference numeral 506 represents a comparator for subjecting brightness data 504a of the pixel b or pixel c determined to be smaller and brightness data 501a of the pixel a stored in the memory 501. The comparator 506 is in the form of a circuit for selecting the smaller value, that is, the pixel having the smallest brightness data among the three pixels, as the minimum value.

Figure 6:
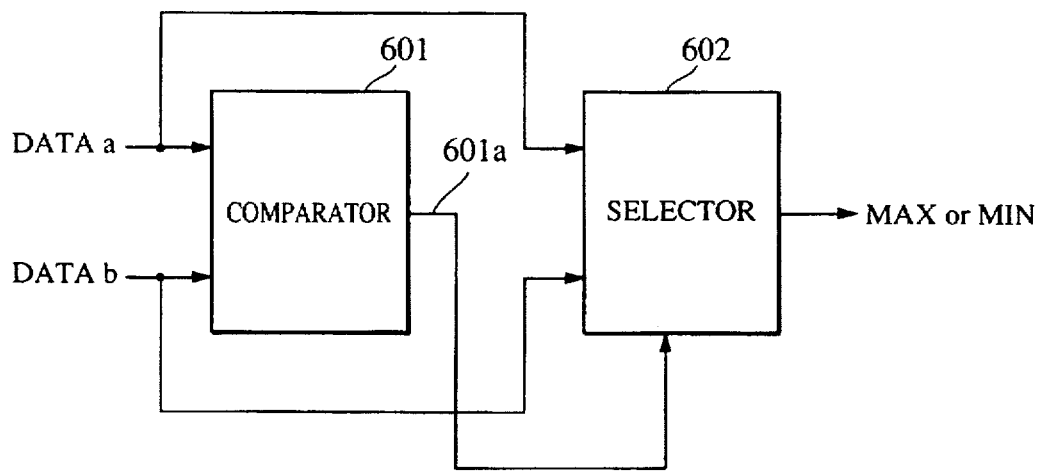
FIG. 6 is a block diagram which illustrates circuits for use in the comparator 414 shown in FIG. 4 (a) and the comparators 502, 505 and 506 shown in FIG. 5.

FIG. 6 is a circuit diagram which illustrates a comparator for use in the circuits of FIGS. 4 (a) and 5.

Reference numeral 601 represents a comparator which compares as inputs, signals each having bits equal in number to the bits per pixel of the brightness data being processed. Reference numeral 601a represents an output signal.

Reference numeral 602 represents a selector for selecting between two brightness data items (data a and data b), which are the subject of the comparison by comparator 601, in response to an output signal 601a from the comparator 601.

Figure 7:
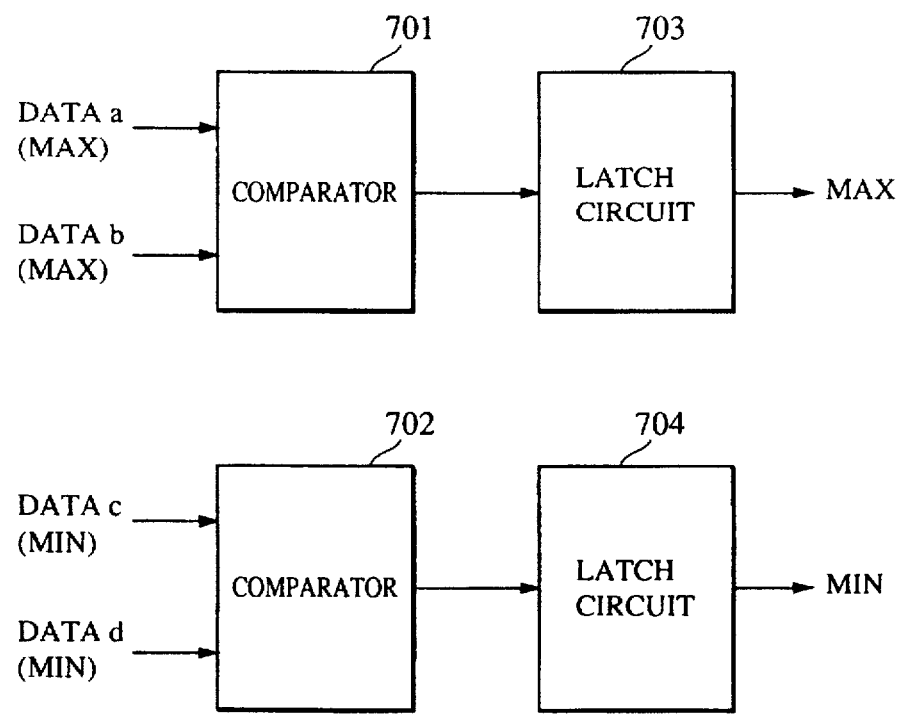
FIG. 7 is a block diagram which illustrates a circuit for calculating larger and smaller ones from combination of two maximum values and minimum values.

FIG. 7 illustrates a circuit for obtaining the larger maximum value and the smaller minimum value from the combination of the two maximum values and minimum values. Reference numerals 701 and 702 represent the comparators shown in FIG. 6 that select the larger value and smaller value, respectively. Reference numerals 703 and 704 represent latch circuits.

Figure 8:
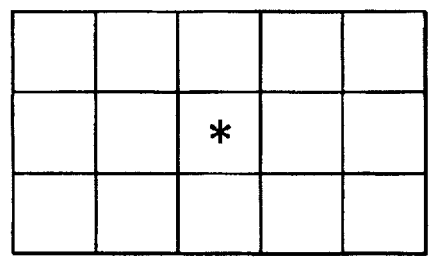
FIG. 8 is a diagram which illustrates the shape of an attribute discriminating matrix.

FIG. 8 is a diagram which illustrates the shape of the reference matrix for discriminating the attribute of a pixel of interest (the pixel of interest is indicated by the asterisk). Note that the attribute is discriminated for each pixel.

Figure 9:
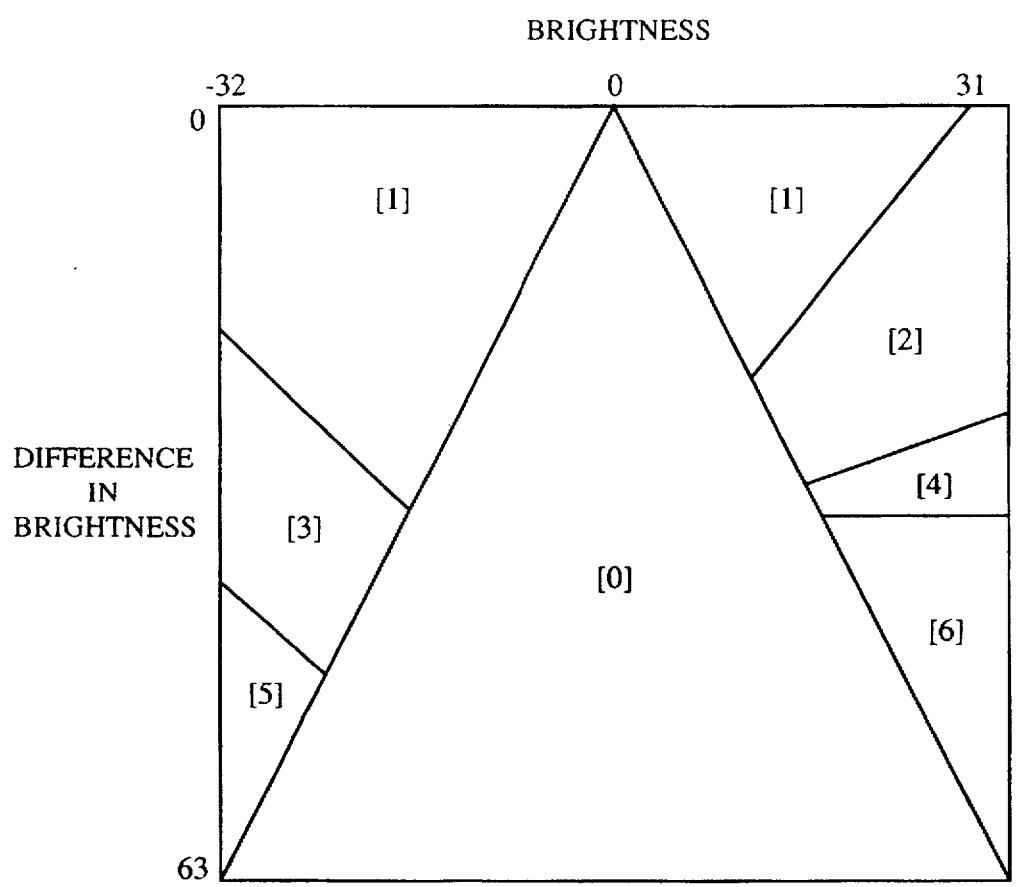
FIG. 9 is a diagram which illustrates the structure of an attribute discriminating portion.

FIG. 9 is a graph showing the correlation of the difference in brightness, and the brightness, for discriminating the attribute. A large difference in brightness means that the difference between the maximum value and the minimum value of brightness data in the reference matrix is large. A small difference in brightness means that the difference between the maximum value and the minimum value of brightness data in the reference matrix is small. A large brightness means that the maximum value of brightness data in the reference matrix is larger than the fixed threshold as a result of a comparison. The larger the maximum value is, the larger the brightness is. In this case, data near white is present in the reference matrix. A small brightness means that the minimum value of brightness data in the reference matrix is smaller than the fixed threshold. The smaller the minimum value is, the smaller the brightness is. In this case, data near black is present in the reference matrix. A structure may be employed in which the foregoing region is made to be variable arbitrarily to obtain a desired result of discrimination.

Region [0] shown in FIG. 9 is a region the points in which cannot occur, theoretically.

The attribute discriminating portion 108 supplies the two parameters obtained for use to discriminate the attribute, that is, the difference in brightness and the brightness, to the RAM or the ROM as addresses. The attribute discriminating portion 108 obtains an output signal for selecting one density data value from among a plurality of density data items, the density of which has been corrected by the density correction portion 103, and an output signal for selecting the weighting coefficient of the error diffusion matrix from data indicated on the map shown in FIG. 9.

Six graphs shown in FIGS. 11 [1] to 11 [6] respectively show density correction tables, in which the correspondence between inputs and outputs are expressed in the form of graphs.

FIG. 11 shows a case where the difference in brightness in the reference matrix is small. The attribute of the reference matrix to be accessed in this case is a halftone region, substantially regardless of the brightness.

In the halftone region, density data corrected in accordance with the table shown in FIG. 11 is selected. The foregoing selection is performed in such a manner that the selector 109 selects density data from the density correction portion 107 in accordance with the result of the attribution discrimination performed by the attribute discriminating portion 108. The density correction table of FIG. 11 is a table for, as it is, converting input density data into the output density data. Input density data the density value of which is 2 or less, is transmitted as a density value of zero. As a result, spot-like noise can be removed from full-white portions. Since data the density of which has been corrected in accordance with the table, is data obtained by correctly converting halftone level data into input data, a high quality halftone image can be obtained.

FIG. 11 shows a case where the difference in brightness in the reference matrix is small and the brightness is large. The attribute of the reference matrix to which this case must be accessed is a region in which white and gray (a halftone region) are present, having a relatively small density value. In this region, density data corrected with the table shown in FIG. 11 is selected. The foregoing selection is performed in such a manner that the selector 109 selects density data from the density correction portion 107 in accordance with the result of the attribute discrimination performed by the attribute discriminating portion 108. The density correction table shown in FIG. 11 is a table acting to convert the density value of output density data into 63 if the density value of input density data is 27 or more, to convert the same into 0 if the density value of input density data is 8 or less, and as it is convert input density data (the density value is from 8 to 27) between the foregoing values into the output density. The foregoing table enables a gray portion to be reproduced correctly and the boundary between a gray portion and a white portion to be expressed clearly. Furthermore, dot-like noise can be prevented.

FIG. 11 shows a case where a somewhat large difference in brightness in the reference matrix is present and the brightness is small. The attribute, to which this case must be accessed, is a region composed of a black region and a gray region having a relatively large density value. In such region, density data corrected in accordance with the table shown in FIG. 11 is selected. The foregoing selection is performed in such a manner that the selector 109 selects density data from the density correction portion 107 in accordance with the result of the attribute discrimination performed by the attribute discriminating portion 108. The density correction table shown in FIG. 11 is a table acting to convert the density value of output density data into 63 if the density value of input density data is 42 or more, to convert the same into 0 if the density value of input density data is 8 or less, and as it is convert input density data (the density value is from 8 to 42) between the foregoing values into the output density. The foregoing table enables a gray portion and a black portion to be naturally switched while making the boundary clear.

FIG. 11 shows a case where a somewhat large difference in the brightness in the reference matrix is present and the brightness is large. The attribute of the reference matrix, to which this case must be accessed, is a region consisting of a white portion and a gray portion (characters or the like written thinly) having a relatively small density value. In this region, density data corrected in accordance with the table shown in FIG. 11 is selected. The foregoing selection is performed in such a manner that the selector 109 selects density data from the density correction portion 107 in accordance with the result of the attribute discrimination performed by the attribute discriminating portion 108. The density correction table shown in FIG. 11 is a table acting to convert the density value of output density data into 63 if the density value of input density data is 20 or more, and to convert the same into 0 if the density value of input density data is 20 or less. The foregoing table enables an original document of a type written with, for example, a pencil, the density of which is relatively low, to be output clearly.

FIG. 11 shows a case where the difference in brightness in the reference matrix is large and the brightness is large. The attribute, to which this case must be accessed, is a region including a character portion and a full-black portion. In this region, density data corrected in accordance with the table shown in FIG. 11 is selected. The foregoing selection is performed in such a manner that the selector 109 selects density data from the density correction portion 107 in accordance with the result of the attribute discrimination performed by the attribute discriminating portion 108. The density correction table shown in FIG. 11 is a table acting to convert the density value of output density data into 63 if the density value of input density data is 15 or more, and to convert the same into 0 if the density value of input density data is 15 or less. The foregoing table enables dot-like noise generated in a boundary portion between a character portion or a full black portion and a white portion to be prevented, thus clearing the boundary.

FIG. 11 shows a case where the difference in brightness in the reference matrix is large and the brightness is large. The attribute, to which this case must be accessed, is a region which includes a character portion and/or a full black portion and in which the level of the white level is relatively higher. In the foregoing region, density data corrected in accordance with the table shown in FIG. 11 is selected. The foregoing selection is performed in such a manner that the selector 109 selects density data from the density correction portion 107 in accordance with the result of the attribute discrimination performed by the attribute discriminating portion 108. The density correction table shown in FIG. 11 is a table acting to convert the density value of output density data into 63 if the density value of input density data is 10 or more, and to convert the same into 0 if the density value of input density data is 10 or less. Use of the foregoing table prevents wanting of a portion of a character or a line, that prevents an improvement in the image quality.

By constituting the tables shown in FIGS. 11 [1] to 11 [6] by a RAM and by making numerals for use in the tables variable, desired output data can be obtained. For example, a character-like image can be formed or a halftone-like image can be formed.

Figure 10:
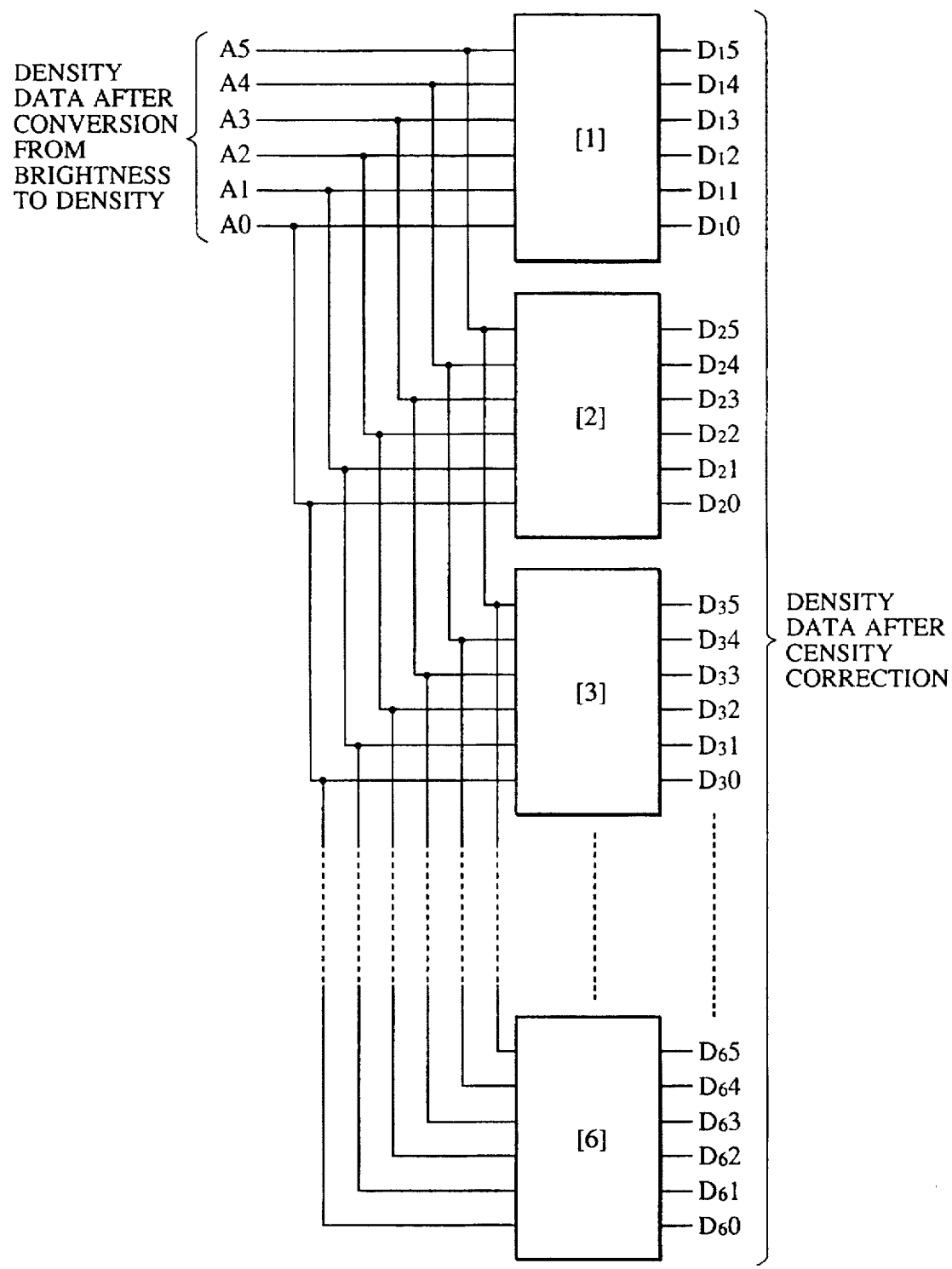
FIG. 10 is a diagram which illustrates the structure of a density correction table constituted by a ROM.

An example is shown in FIG. 10 in which a ROM is used to make the density correction table for correcting density data after the brightness and the density have been converted by the density correction portion 107.

Density data converted from brightness data by the brightness-to-density conversion portion 106 is supplied to addresses A0 to A5 of the ROM, and then outputs Dn0 to Dn5 of density data corrected for each table are obtained. Note that n is 1 to 6 corresponding to the tables shown in FIGS. 11 [1] to 11 [6], respectively.

The density correction portion 107 has a plurality of correction tables to correct, with different correction tables, the density of density data transmitted as a result of the same brightness-to-density conversion. The correction value varies depending upon the categorization of the attribute discrimination such that the six tables are used to correct the density of density data subjected to the brightness-to-density conversion performed by one table. The tables shown in FIGS. 11 [4], 11 [5] and 11 [6] may comprise comparators in place of the density correction tables comprising the ROM shown in FIG. 10 to make the density value zero if the input density data is smaller than a certain threshold and to make the same to be the maximum possible value of the density (63 in this case) if the input density data is larger than the foregoing threshold.

A comparator may be used which makes the converted density of the table shown in FIG. 11 for example zero if the density value is smaller than 20 and which makes the same 63 if the density value is 20 or more.

An arrangement may be employed in which the numerals for use in the tables of FIGS. 11 [1], 11 [2] and 11 [3] and the comparators [4], [5] and [6] are made to be variable to obtain an arbitrary output. The number of the tables and of the comparators may be increased to divide the attribute more finely.

Figure 12:
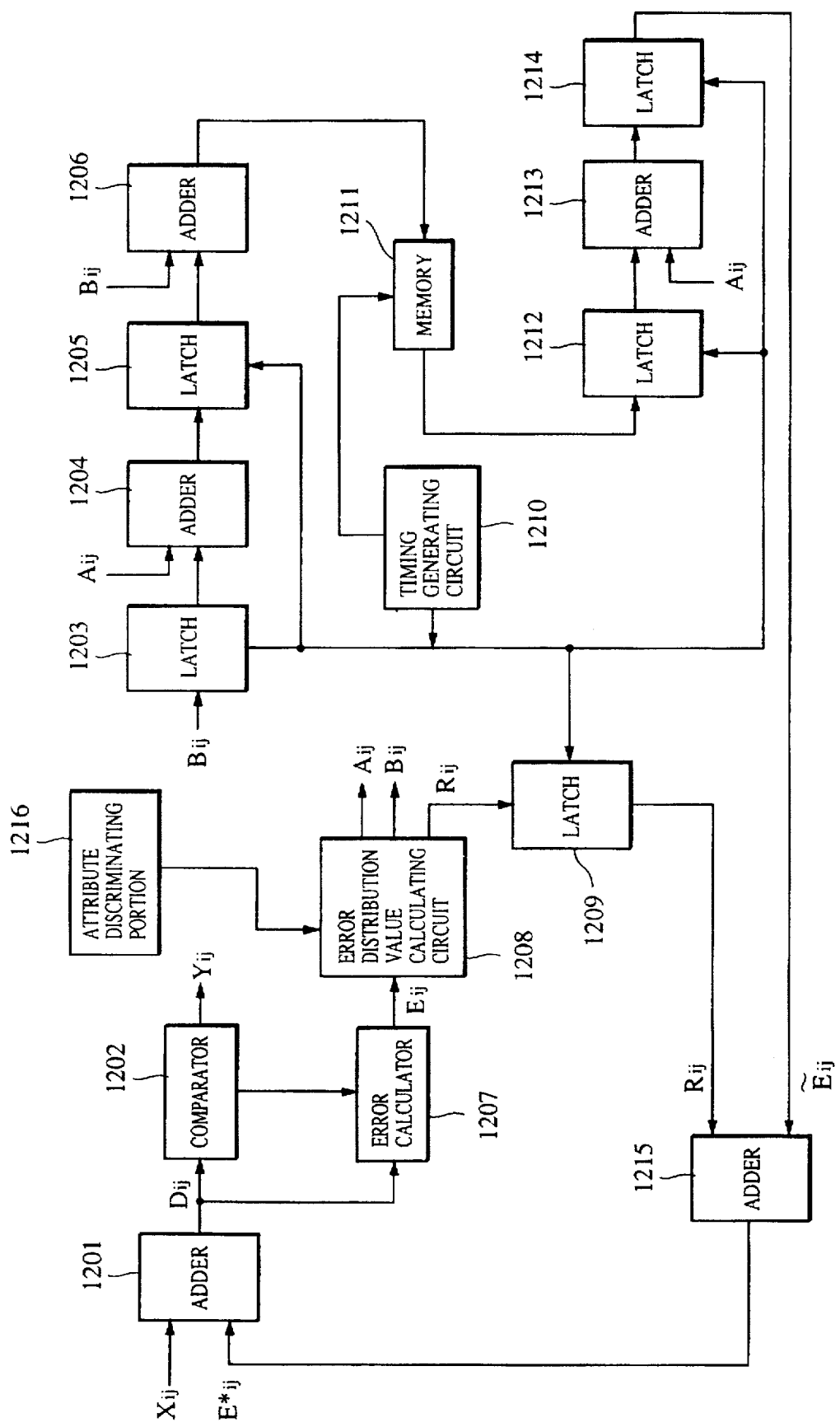
FIG. 12 is a block diagram which illustrates the error diffusion processing portion 110 shown in FIG. 1.

FIG. 12 is a block diagram which illustrates the error diffusion processing portion 110. Data Xi. j (density data) transmitted from the selector 109 is, in an adder 1201, added to error data E* i. j generated when the binary-coding process has been performed and transmitted from an adder 1215. Data Di. j, the error of which has been corrected, is expressed by the following equation:

$$Di. j = Xi. j + E* i. j$$

The data di. j is, in a comparator 1202, binary-coded with a threshold (T=32). That is, the binary-coded output Yi. j is expressed as follows:

$$Di. j \geq T \ldots Yi. j=63$$
$$Di. j < T \ldots Yi. j=0$$

The data Di. j obtained from the adder 1201 is transmitted to an error calculating portion 1207. The error calculating portion 1207 calculates error Ei. j for dispersal to peripheral pixels in accordance with Di. j and the binary-coded output Yi. j. That is, Ei. j can be expressed as follows:

$$Ei. j = Di. j - Yi. j$$

The thus-obtained error Ei. j is transmitted to an error distribution value calculating circuit 1208. The error distribution value calculating circuit 1208 calculates the quantities of error to be distributed to four peripheral pixels of the pixel of interest.

Figures 13, 14:
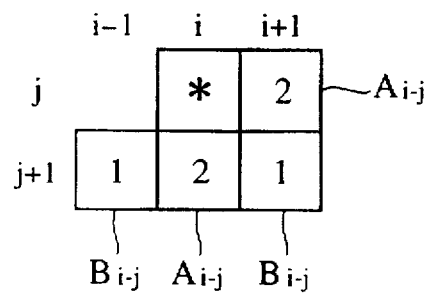
FIG. 13 is a diagram which illustrates an error diffusion matrix for use in an error diffusion process.
FIG. 14 is a diagram which illustrates the correspondence of weighting coefficients for use in the error diffusion process.

FIG. 13 is a diagram showing a weighting matrix for use in an error diffusion process, the matrix indicating the positions and the ratio of pixels to which the error Ei. j generated in the pixel X of interest.

FIG. 14 illustrates the correspondence of the weighting coefficients of the weighting matrices employed in the error diffusion process. Reference numeral 1401 represents a case of a halftone image, 1402 represents a case of an image between a binary-coded image and a halftone image, and 1403 represents a simply binary-coded image. When the table shown in FIG. 11 is selected in accordance with the result of discrimination performed by the attribute discriminating portion 108, the coefficient 1401 is selected. When the table of FIG. 11 or 11 [3] is selected, the coefficient 1402 is selected. When the table of FIG. 11, 11 [5] or 11 [6] is selected, the coefficient 1403 is selected. The foregoing coefficients can be set to values corresponding to the actual state by making the coefficients programmable. By changing the shape of the error diffusion matrix in the error diffusion process, an effect similar to that obtainable from changing the weighting coefficient can be obtained. Referring to FIG. 14, reference numeral 1404 represents a case of a halftone image, 1405 represents a case of an image between a binary-coded image and a halftone image and 1406 represents a simply binary-coded image. When the table shown in FIG. 11 is selected in accordance with the result of discrimination performed by the attribute discriminating portion 108, the matrix 1404 is selected. When the table of FIG. 11 or 11 [3] is selected, the matrix 1405 is selected. When the table of FIG. 11, 11 [5] or 11 [6] is selected, the matrix 1406 is selected. As a result, a further high quality output image can be obtained.

The error distribution value calculating circuit 1208 determines error quantities Ai. j and Bi. j as follows, wherein although the case of 1401 shown in FIG. 14 is described, the error quantities can be obtained similarly in other cases:

$$Ai. j = 2 \times \text{Int} \ (Ei. j \times \tfrac{1}{6})$$

$$Bi. j = \text{Int} \ (Ei. j \times \tfrac{1}{6})$$

However, the error distribution value calculating circuit 1208 is arranged to neglect places of decimals. That is, the error distribution value calculating circuit 1208 is able to calculate integers. By neglecting places of decimals, remainder Ri. j is generated between the error Ei. j generated in the pixel of interest and the errors Ai. j and Bi. j for dispersal to four peripheral pixels calculated by the error distribution value calculating circuit 1208. The foregoing fact is expressed by the following equation:

$$Ri. j = Ei. j - 2 \times (Ai. j + Bi. j)$$

The foregoing remainder Ri. j is supplied to the latch 1209 so as to be delayed by one pixel before being added to input data Xi. j of the next pixel.

On the other hand, the error Ai. j is supplied to an adder 1213 to be distributed to pixel (i+1, j) and an adder 1204 to be distributed to pixel (i, j+1). The error Bi. j is supplied to a latch 1203 to be distributed to pixel (i+1, j+1) and an adder 1206 to be distributed to pixel (i−1, j+1).

A memory 1211 is a memory for storing an error to be dispersed to the j+1 th line, the memory 1211 being capable of storing error data of pixels for at least one line.

A timing generating circuit 1210 generates a variety of signals, such as latch signals to be supplied to the latch circuits 1209, 1203, 1205, 1212 and 1214 and an address signal to be supplied to the memory 1211.

After the foregoing processing for one line has been completed and the processing of the next line has been commenced, an error generated in the previous line is read from the memory.

The error read from the memory is, in the adder 1213, added to an error generated at one forward pixel so as to be transmitted from the latch 1214.

The error is read from the line memory 1211 under control of a timing generating circuit 1215 so that the reading corresponds to the forward line. The timing generating circuit 1215 controls the reading in such a manner that if the pixel of interest is Xi the address Mi-3 in the memory 1211 is read. The address Mi-3 means address i-3 in the memory in which the total errors generated to Xi-3 is written.

By subjecting all input data items to the foregoing processing, the data can be binary-coded by the error diffusion method.

Since the error diffusion method is able to perform binary-coding processing while maintaining the density, excellent scale expression can be performed and a satisfactory resolution can be obtained. In addition, moire generation can be prevented when a halftone dot image is processed.

Even if the weighting coefficient is made constant, a satisfactory high quality image can be obtained and the structure can be simplified.

A structure may be employed in which the shape of the matrix can arbitrarily be changed.

Data binary-coded by the error diffusion processing portion 110 is recorded by the printer 111, the recording portion of the printer 111 being a thermal transfer, laser beam or ink jet printer employed in a usual recording apparatus.

By recording multi-value data, which has not been binary-coded, by using a printer capable of recording multi-value data, an image, the density of which has been corrected in accordance with the attribute, can be obtained as output data exhibiting an excellent image quantity having a multiplicity of scales for each pixel.

Another structure may be employed in which multivalue data is converted into ternary data or quadruple data to be adaptable to the level that can be recorded by the printer so as to obtain output data of a desired scale.

A structure may be employed in which a transmission means is provided to transmit the output data.

As described above, according to the present invention, the attribute discrimination is automatically performed and the process is performed in accordance with the result of the discrimination. Therefore, a selection operation using external keys can be omitted. Furthermore, a precise discrimination can be made because a plurality of parameters are used to discriminate the attribute. Since the same quantizing method is used while eliminating any need for changing the quantizing method in accordance with the attribute, the structure can be simplified, and discontinuous image due to switching between quantizing methods can be prevented. In addition, since the processing is performed in accordance with the results of the precise discrimination of the attribute, generation of dot-like noise, such as generation of white dots in a full black portion or generation of black dots in a full white portion, can be prevented. Thus, confirmation of noise can be restricted and a clear image can be obtained, because the image will not thinned even if the original document is one having a relatively low density, such as one written with a pencil. As a result, a high quality image in accordance with the attribute can be obtained. Since the attribute discriminating portion, the brightness-to-density conversion portion and the density correction portion are preferably in table form, a more precise discrimination and high speed data exchange can be performed. As a result, the circuits can be simplified and the size of the same can be reduced.

Although this embodiment has the arrangement that one density data value is selected from the plural density data items corrected by the plural density correction tables and the weighting coefficient is selected in accordance with the result of the attribute discrimination, selection of either of the two may in a particular case be sufficient obtain an excellent image.

Although the error diffusion method has been employed in this embodiment as the density maintaining type binary-coding method, this embodiment can be realized using an average error minimizing method, or by another density maintaining type binary-coding method, such as an average density maintaining method having an arrangement that an average value of binary-coded data is binary-coded as the threshold and the error between the input data and the foregoing average value is corrected to perform binary-coding.

Although the two parameters, that is, the difference in brightness and the brightness, are used to discriminate the attribute in this embodiment, the quantity of edges, obtained by a Laplacian method, may be used in place of the difference in brightness. In place of the brightness as used above, brightness expressed by an absolute value having no sign may be used. As an alternative to the fixed threshold for use to obtain the brightness, the average value in the reference matrix may be used. In addition, the average value may itself be used as the value for brightness. Furthermore, three parameters consisting of the two parameters according to this embodiment and the foregoing average value, may be used in a correlated manner to perform still more precise discrimination.

Second Embodiment

The first embodiment has the arrangement that the binary-coding is performed in such a manner that brightness data obtained by the input selector is converted into density data and then the density data is corrected. A second embodiment will now be described, which has an arrangement that the brightness-to-density conversion and the density correction are performed simultaneously, and a digital comparator is used only in a case where a brightness signal is converted as binary data (binary extreme value 0 or 63).

Figure 15:
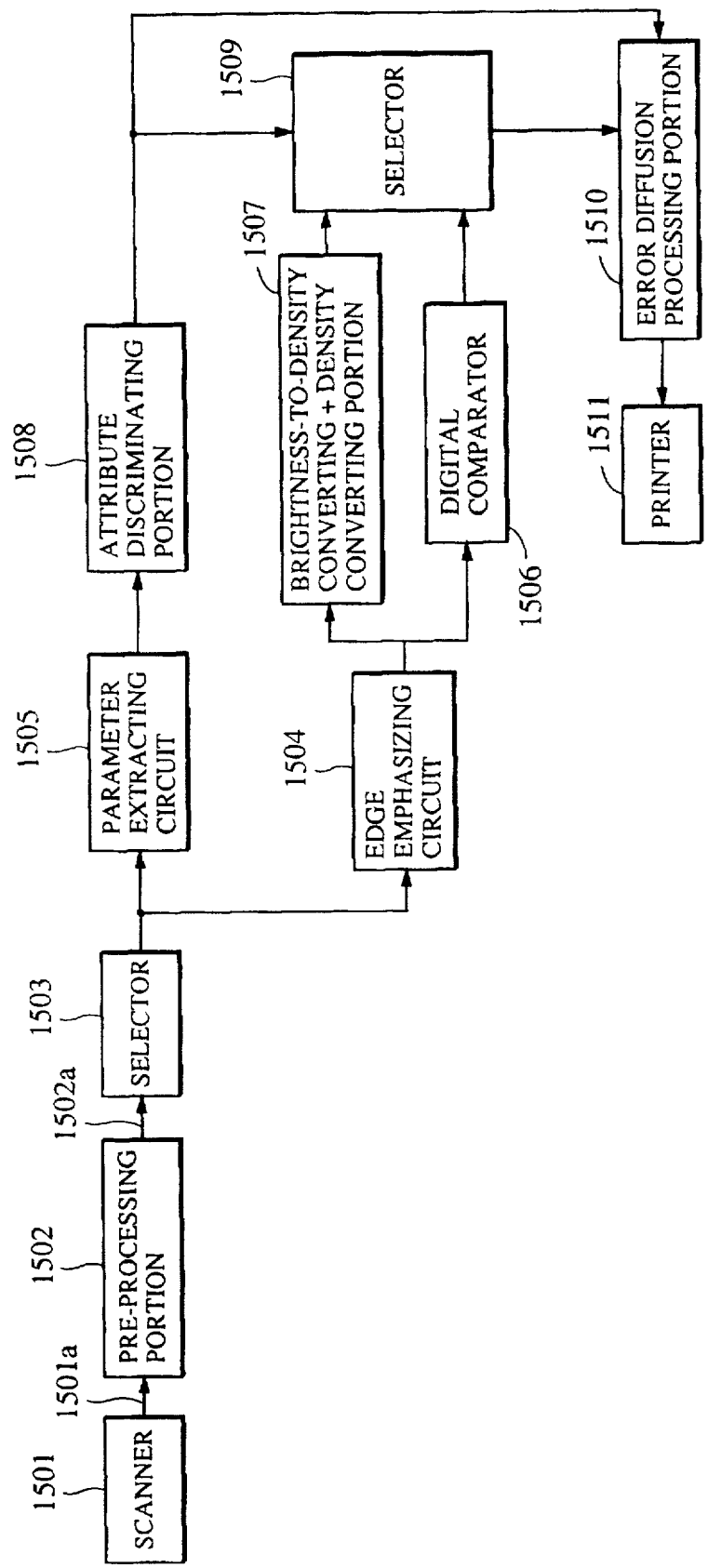
FIG. 15 is a block diagram which illustrates an image processing apparatus according to a second embodiment.

FIG. 15 is a block diagram which illustrates an image processing apparatus according to a second embodiment of the present invention. Note that the second embodiment has the same structure as that of the first embodiment except the portion for converting brightness data to density data.

Reference numeral 1506 represents a circuit for binary-coding a brightness signal by a digital comparator, the circuit having a programmable threshold and a plurality of comparators to obtain a density signal.

Reference numeral 1507 represents a brightness-to-density conversion and a density correction portion comprising a table capable of simultaneously performing the brightness-to-density conversion and the density correction to convert a supplied brightness signal into a density signal.

The other components perform similar operations to those of the components according to the structure shown in FIG. 1.

Both the supplied brightness signal and the density signal to be transmitted are 6-bit data items.

The brightness-to-density conversion table is preferably constituted by a memory, such as a RAM or a ROM.

Each of the digital comparator 1506 and the brightness-to-density conversion and density correction portion 1507 is constituted by a plurality of tables and a plurality of digital comparators. In a case where conversion shown in FIG. 11 is performed, for example, the tables are used if conversion to multi-value data must be performed as shown in the graph of FIG. 11, 11 [2] or 11 [3]. If conversion to binary data must be performed as shown in the graph of FIG. 11, 11 [5] or 11 [6], the digital comparators are used. In the foregoing case, three tables and three digital comparators are provided. By using the brightness-to-density conversion and the density correction simultaneously and by using the comparator to obtain the binary-coded density data, the size of the circuit can be reduced as compared with a case where a RAM or a ROM is used.

Third Embodiment

The first embodiment has the arrangement that the binary-coding is performed in such a manner that brightness data obtained by the input selector is converted into density data and then the density data is corrected. A third embodiment will now be described with has an arrangement such that the brightness-to-density conversion and the density correction are performed simultaneously.

Figure 16:
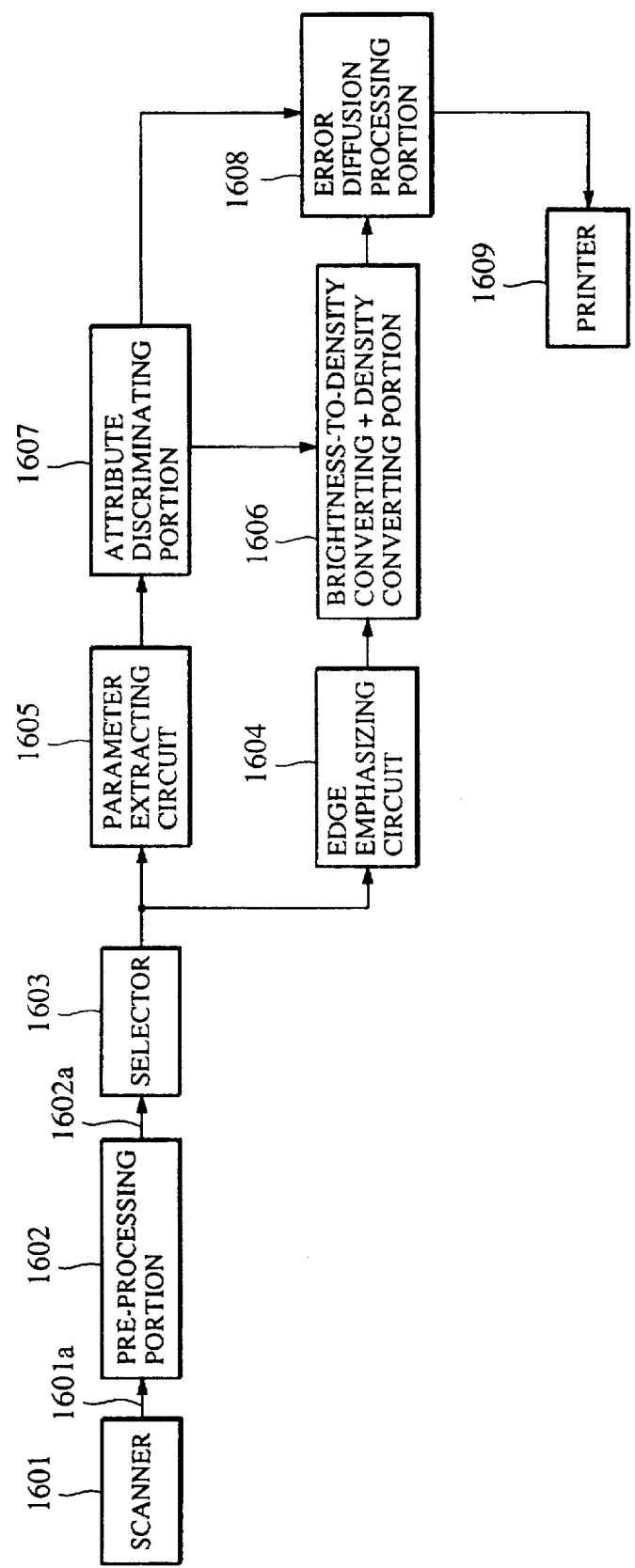
FIG. 16 is a block diagram which illustrates an image processing apparatus according to a third embodiment.

FIG. 16 is a block diagram which illustrates an image processing apparatus according to a third embodiment. The image processing apparatus according to this embodiment has the same structure as that shown in FIG. 1. Therefore, its detailed description is omitted here.

Reference numeral 1606 represents a table for simultaneously performing the brightness-to-density conversion and the density correction, the table receiving a brightness signal and transmitting an output signal each of which is 6-bit data. The brightness-to-density conversion and density correction table is preferably constituted by a memory, such as a RAM or a ROM.

The brightness-to-density conversion and density correction portion 1606 shown in FIG. 16 receives brightness data obtained from an edge emphasizing circuit 1604 and transmits only density data corresponding to an address signal obtained from the attribute discriminating portion 1607. In accordance with the categorization of the result of the attribute discrimination, the conversion value and the correction value are varied. In this embodiment, the brightness-to-density conversion and the density correction are performed simultaneously. As described above, according to the third embodiment, the brightness-to-density conversion and the density correction can be performed by a section composed of one ROM or one RAM while eliminating any need for a selection process to be performed by a selector. Therefore, the size of the hardware can be reduced.

Fourth Embodiment

The first embodiment has the arrangement that the discrimination is performed by using two parameters, that is, the difference in the brightness and the brightness obtained in the forward stage of the attribute discrimination.

A fourth embodiment will now be described which has an arrangement in which the maximum value and the minimum value are used as the parameters to discriminate the attribute. This is done because the two parameters, which are the difference in brightness and the brightness, can be obtained from the maximum value and the minimum value in the reference matrix.

Since the fourth embodiment has the same structure as that shown in FIG. 1 except the operations of the parameter extracting circuit and attribute discriminating portion, the description will be made with reference to FIG. 1.

The parameter extracting circuit 105 obtains the maximum value and the minimum value of the brightness in a reference matrix by calculations.

The shape and the size of the reference matrix are the same as those according to the first embodiment shown in FIG. 8. Also, the structure of the hardware for obtaining the maximum value and the minimum value is the same as that according to the first embodiment.

The attribute discriminating portion 108 discriminates the attribute from the two parameters obtained by the parameter extracting circuit 105, namely, the maximum value and the minimum value of the brightness in the reference matrix, to classify them into categories. Specifically, the parameters are supplied to a RAM or a ROM having two parameters as addresses, and data (a signal for selecting one table from a plurality of conversion tables) corresponding to the address is obtained as an output so as to perform discrimination. Data to be stored in the table (the RAM or the ROM) for discriminating the attribute is determined in accordance with the correlation of the two parameters.

The reason why the structure of the attribute discriminating portion is different from that according to the first embodiment is that the parameters to be supplied are different from each other. Although only the structure from the portion for obtaining the maximum value and the minimum value to the portion for obtaining the signal for the attribute discriminate is changed, the same signal can be obtained.

Since the structure except the parameter extracting circuit 105 and the attribute discriminating portion 108 is the same as that shown in FIG. 1, the same portion is omitted from the description.

Figure 17:
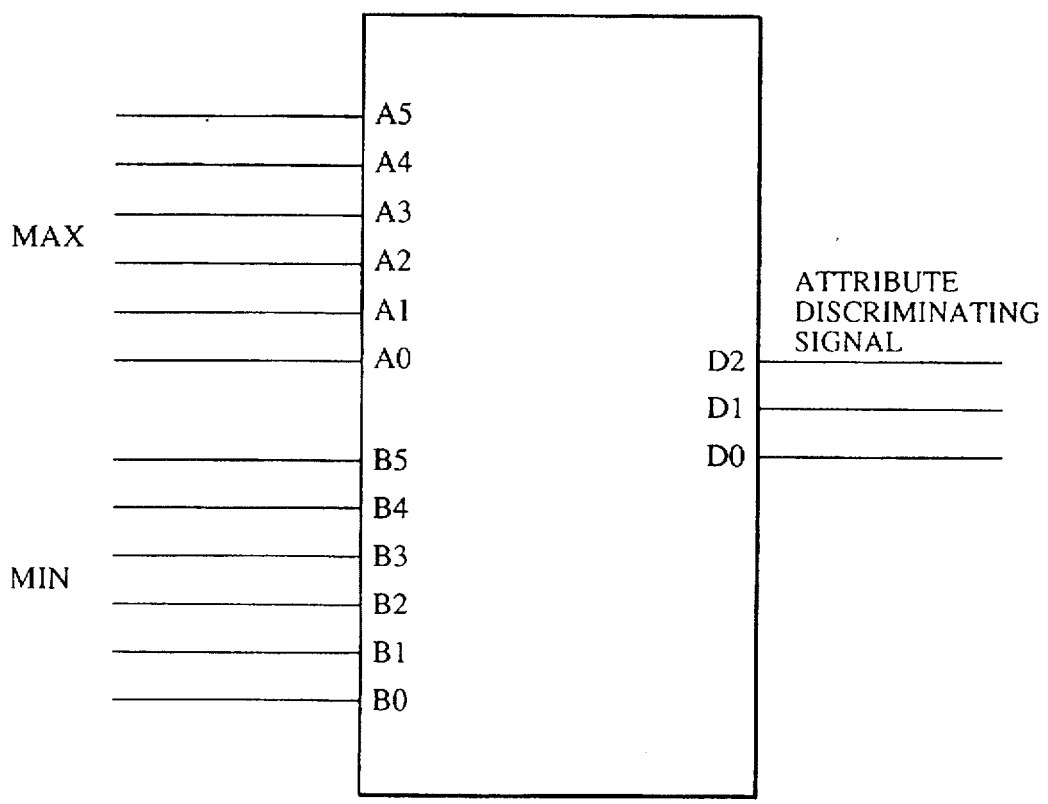
FIG. 17 is a diagram which illustrates the structure of an attribute discriminating portion according to a fourth embodiment, constituted by a ROM.

FIG. 17 is a diagram which illustrates the structure of the attribute discriminating portion constituted by a ROM according to the fourth embodiment.

The attribute discriminating portion receives 6-bit data about the maximum value and the minimum value, which are the parameters to obtain a 3-bit signal for discriminating the attribute.

Although the table for the attribute discrimination is accessed by the correlated maximum value and the minimum value in the reference matrix, setting is performed such that a table similar to that accessed by the correlated difference in the brightness and the brightness can be accessed.

According to the fourth embodiment, the maximum value and the minimum value in the reference matrix are used as the parameters. Therefore, the size of the parameter extracting circuit can be reduced.

Fifth Embodiment

The first and fourth embodiments has the arrangement that the two parameters (each of which is 6-bit data) obtained in the previous stage of the attribute discrimination to perform the discrimination.

The fifth embodiment has the arrangement that only the upper bits of the two 6-bit parameters are used to discriminate the attribute. Although the precision of the discrimination cannot be improved by varying the bits, the size of the circuit for discriminating the attribute can be reduced.

Similarly to the fourth embodiment, the fifth embodiment has the same structure as that of the image processing apparatus shown in FIG. 1 except the structure of the attribute discriminating portion constituted by a ROM. Therefore, the same structure is omitted from the description.

Figure 18:
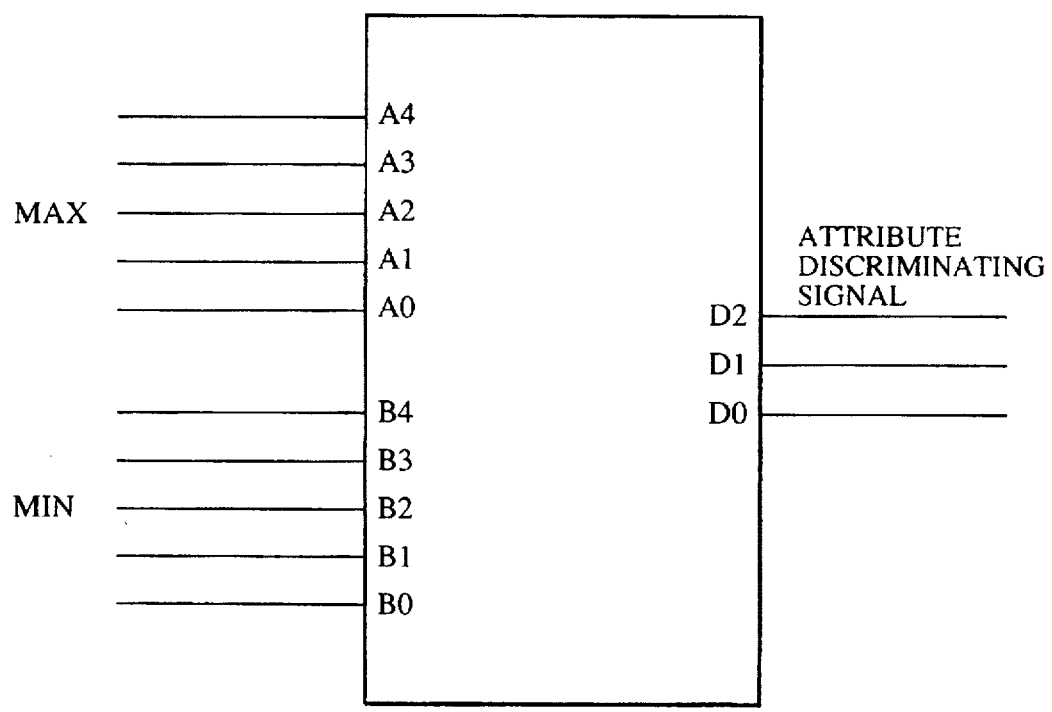
FIG. 18 is a diagram which illustrates the structure of an attribute discriminating portion according to a fifth embodiment, constituted by a ROM.

FIG. 18 is a diagram which illustrates the attribute discriminating portion constituted by a ROM according to the fifth embodiment.

Upper 5-bit data of each of the two parameters is received so as to obtain a 3-bit signal for discriminating the attribute.

As a result, the size of the hardware of the attribute discriminating portion can be reduced.

Sixth Embodiment

Although the first embodiment has the arrangement that the read brightness data is used as it is, a sixth embodiment has the arrangement that the brightness-to-density conversion and the density correction are performed in a case where the reading system and the recording system have different resolutions or after the resolution conversion, such as the enlargement or a contraction of an image, has been performed.

Figure 19:
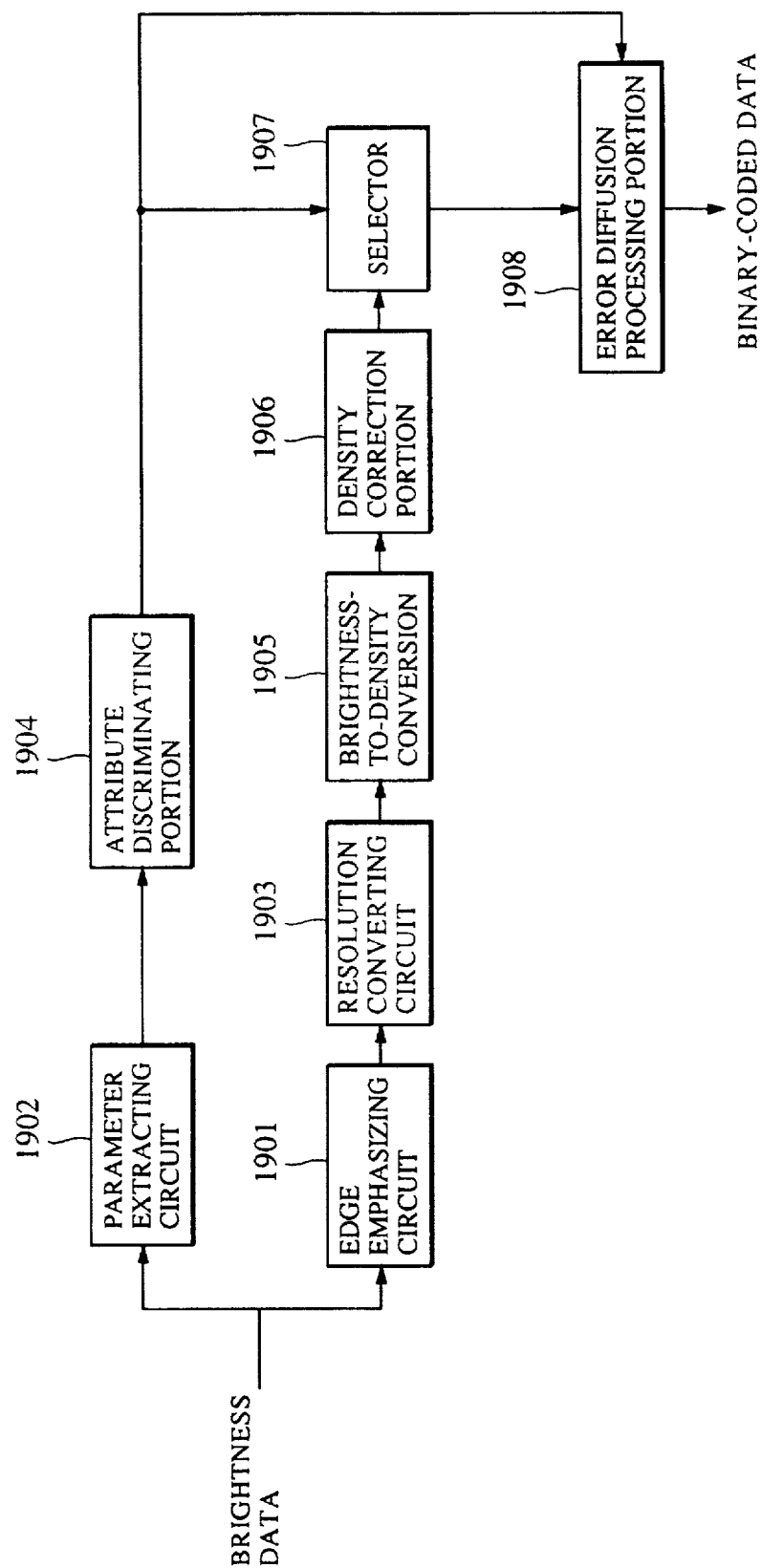
FIG. 19 is a block diagram which illustrates a portion of an image processing apparatus according to a sixth embodiment.

FIG. 19 is a block diagram which illustrates an image processing apparatus according to the sixth embodiment of the present invention. Since the structure of this embodiment is the same as that shown in FIG. 1 except the resolution conversion portion added thereto, the same structure is omitted from the description.

Reference numeral 1901 represents an edge emphasizing circuit for sharpening an image by a Laplacian filter equivalent to a secondary differentiating operation.

Reference numeral 1902 represents a parameter extracting circuit for discriminating the attribute, the parameter extracting circuit 1902 being arranged to obtain the maximum value and the minimum value in accordance with brightness data in the reference matrix and to obtain the difference in brightness and the brightness, which are the parameters, in accordance with the maximum value and the minimum value.

Reference numeral 1903 represents a resolution converting circuit for converting the resolution of brightness data subjected to the emphasized by the edge emphasizing circuit 1901. The resolution converting circuit 1903 converts the resolution of the reading system into that of the recording system and enlarges/reduces the image.

Reference numeral 1904 represents an attribute discriminating portion for discriminating the attribute from the parameters obtained by the parameter extracting circuit 1902. The attribute discriminating portion 1904 receives parameters each having a data quantity of 6 bits as address signals to select one density data item from data items obtained by a plurality of conversion tables and to provide a signal for changing the weighting coefficient of an error matrix. The attribute discriminating portion is constituted preferably by a memory, such as a ROM or a RAM.

Reference numeral 1905 represents a brightness-to-density conversion portion for converting brightness data to density data, the brightness-to-density conversion portion being constituted by a conversion table made of a memory, such as a ROM or a RAM.

Reference numeral 1906 represents a density correction portion for correcting density data converted by the brightness-to-density conversion portion 1905. The density correction portion 1906 is constituted by a plurality of correction tables adaptable to the characteristics of the pixels, such as a table for expressing binary coding by using a fixed threshold. The tables are constituted by a memory, such as a ROM or a RAM.

Reference numeral 1907 represents a selector for selecting a density from a plurality of densities obtained by the density correction portion 1906 in accordance with the result of the attribute discrimination performed by the attribute discriminating portion 1904.

Reference numeral 1908 represents an error diffusion processing portion for quantizing multi-value data selected by the selector 1906, into binary data.

As described above, according to the sixth embodiment, the resolution of an image can be converted and the image can be enlarged/reduced. In addition, a high quality image corresponding to the attribute can be obtained.

Seventh Embodiment

Although the first to sixth embodiments have the arrangement that the attribute is discriminated in accordance with read brightness data, use of brightness data subjected to emphasizing processing to discriminate the attributes, enables a more precise discrimination to be performed. A seventh embodiment will now be described which has an arrangement that edge emphasis is performed to sharpen the image, after which the attribute is discriminated and data is converted.

Figure 20:
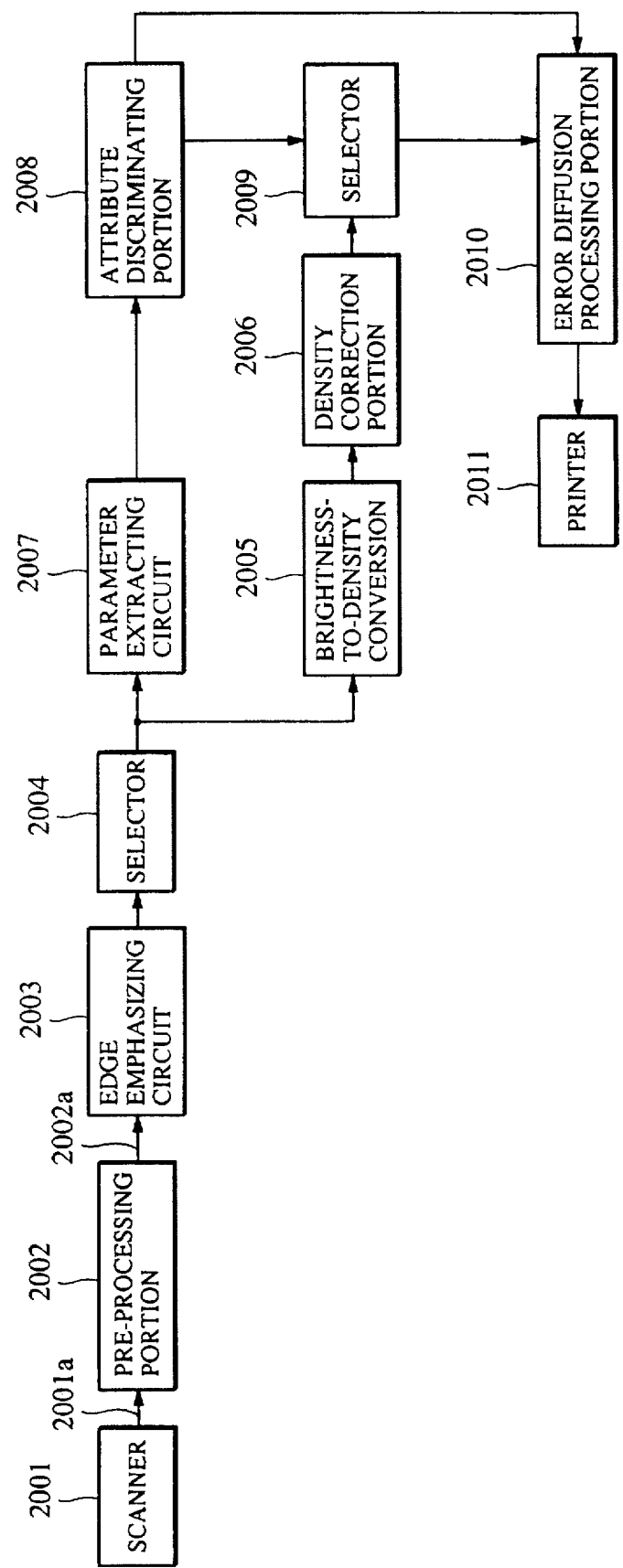
FIG. 20 is a block diagram which illustrates an image processing apparatus according to a seventh embodiment.

FIG. 20 is a block diagram which illustrates an image processing apparatus according to the seventh embodiment of the present invention.

Reference numeral 2003 represents an edge emphasizing circuit for sharpening an image by a Laplacian filter equivalent to a secondary differentiating operation.

Reference numeral 2004 represents a selector for controlling the flow of an image signal supplied from the edge emphasizing circuit 2003.

Reference numeral 2005 represents a brightness-to-density conversion portion for converting brightness data to density data.

Reference numeral 2006 represents a density correction portion for correcting density data converted by the brightness-to-density conversion portion 2005, the density correction portion 2006 having a plurality of density correction tables.

Reference numeral 2007 represents a parameter extracting circuit for obtaining a parameter for discriminating the attribute.

Since the residual portions are the same as those shown in FIG. 1, the same portions are omitted from description.

Figure 21:
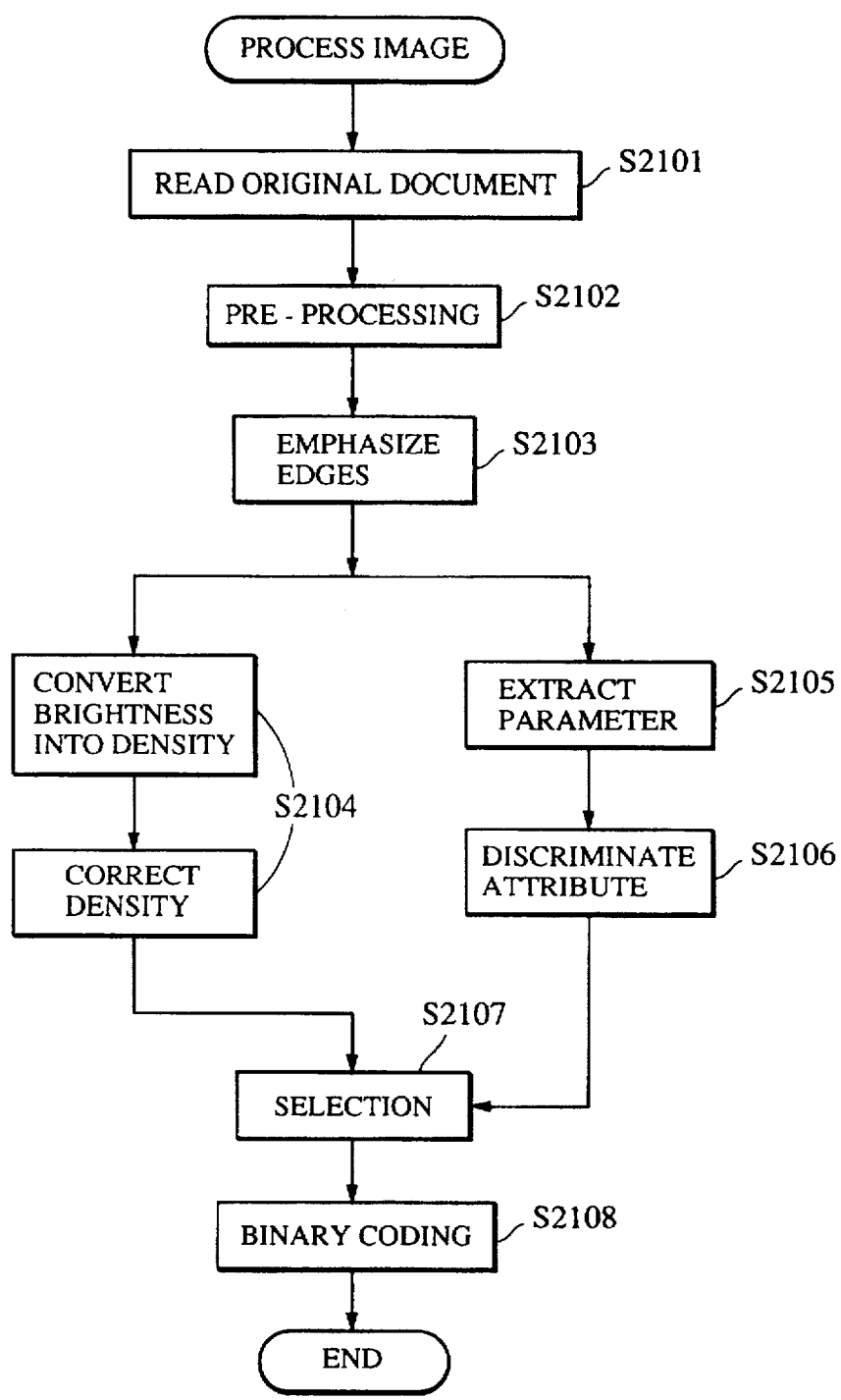
FIG. 21 is a flow chart of a process to be performed by the image processing apparatus according to the seventh embodiment.

FIG. 21 is a flow chart of the process to be performed by the image processing apparatus according to the seventh embodiment of the present invention. The flow is the same as that shown in FIG. 3 except that the process for emphasizing brightness data is performed in step S2102 before the parameter is obtained.

Figure 22:
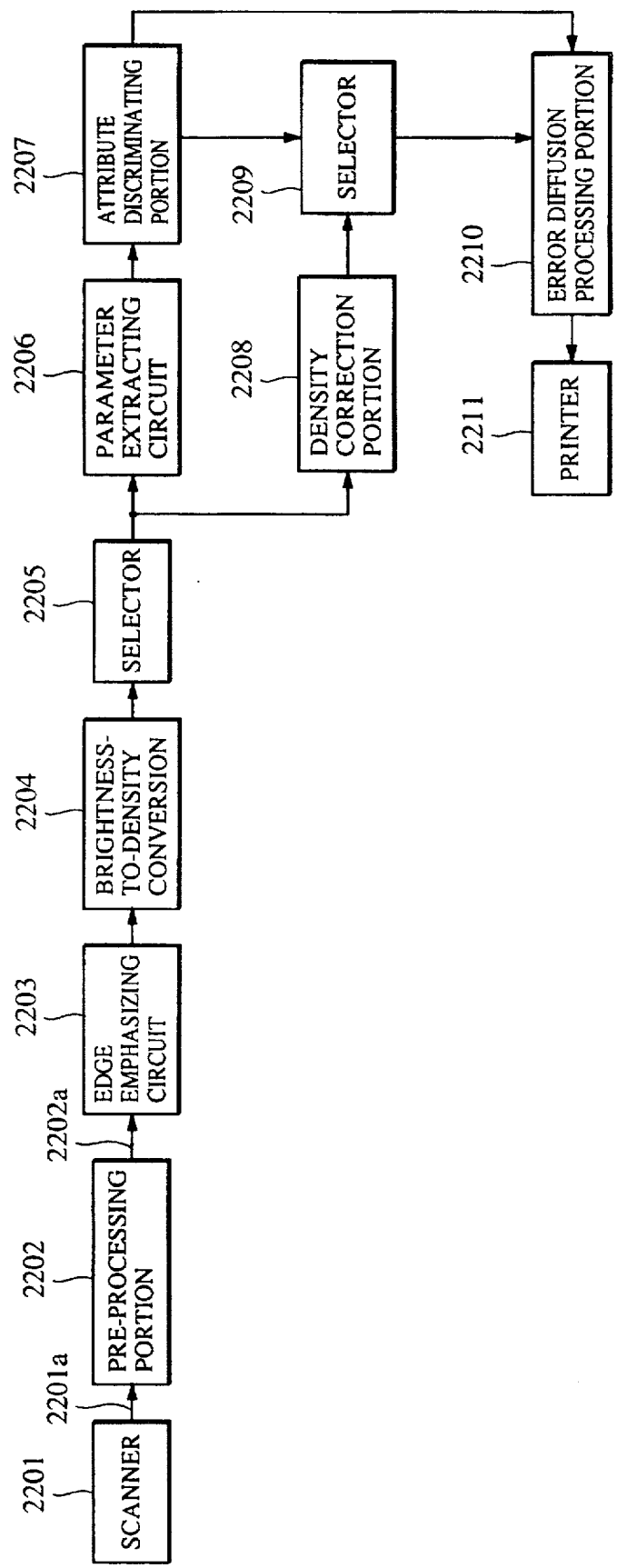
FIG. 22 is a block diagram which illustrates the image processing apparatus according to the seventh embodiment in a case where brightness-to-density conversion is performed first.

It might be feasible to employ a structure in which density data subjected to brightness-to-density conversion is used to determine the parameter. The foregoing structure has an arrangement that brightness data is converted into density data, the difference in density and the density are obtained in accordance with the density data, and the obtained difference and density are used as parameters to discriminate the attribute. FIG. 22 is a block diagram which illustrates an image processing apparatus having the foregoing structure.

Reference numeral 2203 represents an edge emphasizing circuit for sharpening an image by a Laplacian filter equivalent to a secondary differentiating operation.

Reference numeral 2204 represents a brightness-to-density conversion portion for converting brightness data sharpened by the edge emphasizing circuit 2203 into density data.

Reference numeral 2205 represents a selector for controlling an image signal supplied from the brightness-to-density conversion portion 2204.

Reference numeral 2206 represents a parameter extracting circuit for obtaining a parameter for discriminating the attribute.

Reference numeral 2207 represents an attribute discriminating portion for discriminating the attribute by using the parameter obtained by the parameter extracting circuit 2206.

Reference numeral 2208 represents a density correction portion for correcting the density obtained after the brightness-to-density conversion has been performed, the density correction portion having a plurality of density correction tables adapted to the characteristics of the pixel.

Since the residual portions perform the same operations as those shown in FIG. 1, they are omitted from description.

Figure 23:
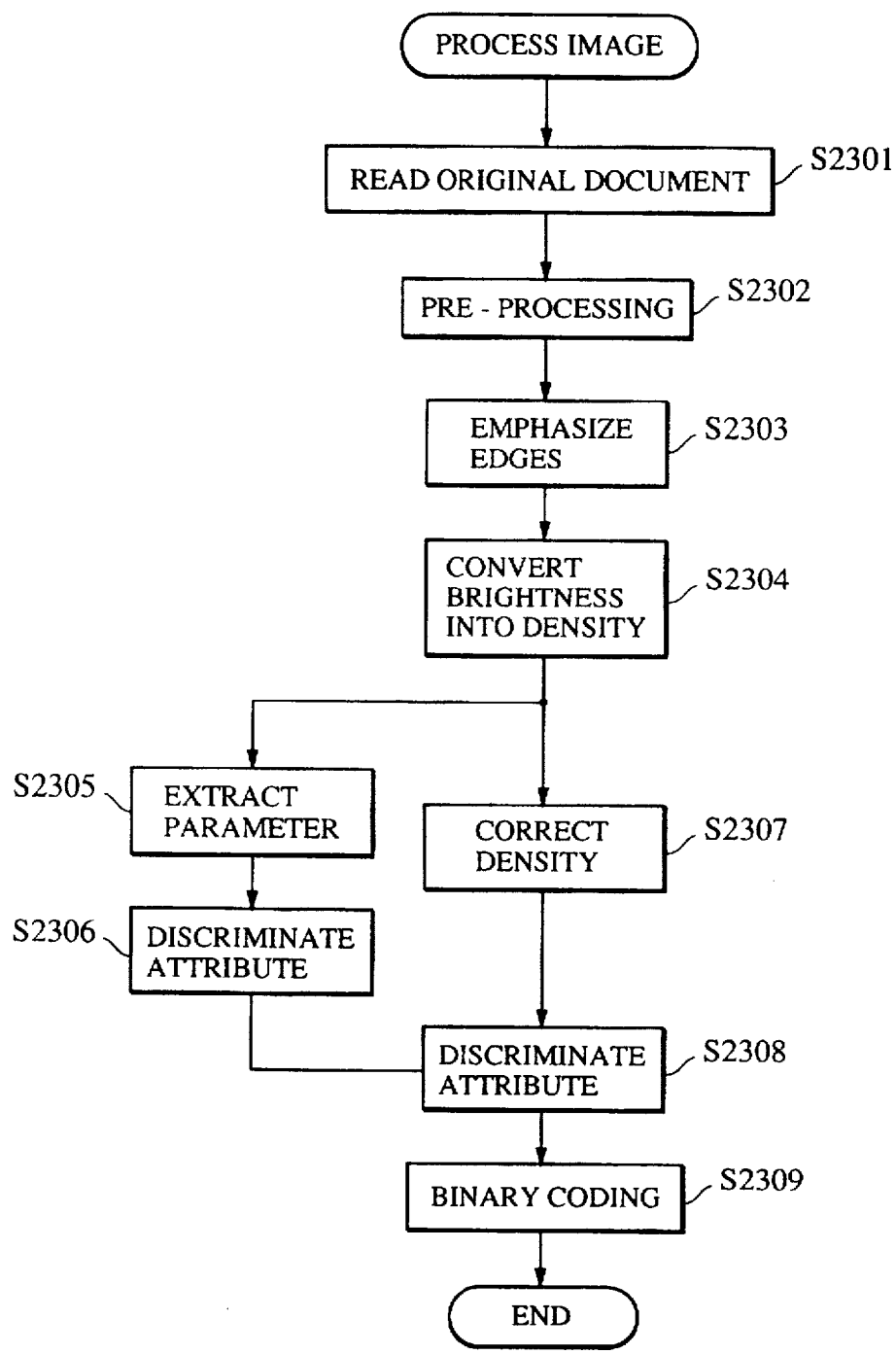
FIG. 23 is a flow chart of a process to be performed by the image processing apparatus shown in FIG. 22.

FIG. 23 is a flow chart showing the process to be performed by the image processing apparatus having the foregoing structure. The process is the same as that shown in FIG. 3 except that brightness data is subjected to an edge emphasizing process in step S2303, the brightness data is converted into density data by the plural brightness-to-density conversion tables in step S2304, a parameter extracting process for discriminating the attribute is performed in step S2305, and a plurality of correction tables are used to correct the density in step S2307.

As described above, according to the seventh embodiment, the parameter is made after the edge emphasizing process has been performed so as to discriminate the attribute. Therefore, characters can be clarified and a more precise discrimination can be performed.

Although the foregoing embodiments have the arrangement that the image is processed by the circuits which are hardware means, the image process can be realized by software.

As described above, according to the present invention, the degree of the character image and the halftone image is discriminated as well as discriminating the character image and the halftone image. Therefore, a further precise attribute discrimination can be performed.

According to the present invention, a high quality image accurately reproducing the attribute of image data can be obtained.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. An image processing apparatus comprising:
   input means for inputting image data;
   means for producing a plurality of parameters from a region consisting of a plurality of input image data, wherein the plurality of parameters includes a first parameter equal to a variation amount of a level of the image data in the region, and a second parameter representative of whether the level of the image data in the region is closer to a predetermined first level or to a predetermined second level which is lower than the first level;
   discriminating means for discriminating an attribute of the region in accordance with the plurality of parameters; and
   conversion means for converting a tone of the image data in the region in accordance with a result of discrimination performed by said discriminating means.

2. An image processing apparatus according to claim 1 further comprising quantizing means for quantizing converted image data produced by said conversion means.

3. An image processing apparatus according to claim 2, wherein said quantizing means quantizes the converted image data in such a manner that the density of pre-quantization image and the density of quantized image coincide with each other.

4. An image processing apparatus according to claim 1, wherein said means for producing the plurality of parameters produces the plurality of parameters by shifting the region by one pixel.

5. An image processing apparatus according to claim 1, wherein said means for producing the plurality of parameters uses a difference between a maximum value and a minimum value of the image data in the region as the first parameter, and uses a difference between a predetermined threshold and said maximum value, or a difference between the threshold and the minimum value, whichever difference has a larger absolute value, as the second parameter.

6. An image processing apparatus according to claim 1, wherein the value of the image data is a brightness value of the image data.

7. An image processing apparatus according to claim 6, wherein said discriminating means discriminates the region to be a region written with light characters if (1) the first parameter is an intermediate level within a predetermined range of first parameter values and (2) the second parameter is larger, within a predetermined range of second parameter values.

8. An image processing apparatus according to claim 6, wherein said discriminating means discriminates the region to be a region composed of black and dark gray, if (1) the first parameter is an intermediate level within a predetermined range of first parameter values and (2) the second parameter is small, within a predetermined range of second parameter values.

9. An image processing apparatus according to claim 7, wherein, when said discriminating means discriminates that the region is a region written with light characters, said conversion means converts data whose density level is higher than a predetermined level, into black, and converts data whose density level is lower than said predetermined level, into white.

10. An image processing apparatus according to claim 8, therein, when said discriminating means discriminates that the region is a region consisting of black and dark gray, said conversion means converts data whose density level is higher than a first density level, into black, and converts data whose density level of which is lower than a second density level, into white.

11. An image processing apparatus according to claim 1, wherein said conversion means converts the tone by using one of a plurality of tone correction tables stored in a storage medium based on the attribute discriminated by said discriminating means.

12. An image processing apparatus comprising:
   input means for inputting image data;
   means for producing a plurality of parameters from a region consisting of input image data for an object pixel and peripheral pixels of the object pixel;
   judging means for judging how closely the region matches character image or halftone image, wherein a matching degree corresponds to one of a plurality of different areas the region falls within based on a correlation of the plurality of parameters, and at least two of the different areas correspond to degrees that indicate the region is a character image; and
   quantizing means for quantizing the image data of the object pixel.

wherein said quantizing means specifies a parameter for use in quantization of the object pixel in accordance with the degree judged by said judging means.

13. An image processing apparatus according to claim 12, wherein said quantizing means distributes an error value, generated when quantizing image data of the object pixel, to peripheral pixels in accordance with a weighting matrix, and binary codes the image data of the object pixel in such a manner that the density of pre-binary-coded image and the density of binary-coded image coincide with each other.

14. An image processing apparatus according to claim 13, wherein said quantizing means changes the value of a coefficient of said weighting matrix in accordance with the result judged by said judging means so as to binary-code the image data of the object pixel.

15. An image processing apparatus according to claim 13, wherein said quantizing means changes a distribution area to which the error value is distributed in accordance with the result judged by said judging means so as to binary-code the image data of the object pixel.

16. An image processing method comprising the steps of:
inputting image data;
producing a plurality of parameters from a region consisting of a plurality of input image data, wherein the plurality of parameters includes a first parameter equal to a variation amount of a level of the image data in the region, and a second parameter representative of whether the level of the image data in the region is closer to a predetermined first level or to a predetermined second level which is lower than the first level;
discriminating an attribute of the region in accordance with the plurality of parameters; and
converting a tone of the input image data in the region in accordance with the discriminated attribute.

17. An image processing method according to claim 16, wherein said producing step includes using a difference between a maximum value and a minimum value of the image data in the region as the first parameter, and using a difference between a predetermined threshold and the maximum value, or a difference between the threshold and the maximum value, whichever difference has a larger absolute value, as the second parameter.

18. An image processing method according to claim 16, wherein said converting step converts the tone by using one of a plurality of tone correction tables stored in a storage medium based on the attribute discriminated in said discriminating step.

19. An image processing method comprising the steps of:
inputting image data;
producing a plurality of parameters from a region consisting of input image data for an object pixel and peripheral pixels of the object pixel;
judging how closely the region matches character image or halftone image, wherein a matching degree corresponds to one of a plurality of different areas the region falls within based on a correlation of the plurality of parameters, and at least two of the different areas correspond to degrees that indicates the region is a character image; and
quantizing the image data of the object pixel,
wherein said quantizing step includes specifying a parameter for use in quantization of the object pixel in accordance with a result judged in said judging step.

20. An image processing method according to claim 19, wherein said quantizing step further includes distributing an error value generated when quantizing the image data of the object pixel to the periphery.

21. An image processing method according to claim 20, wherein said quantizing step further includes changing an allotment of the error value to be distributed to the periphery in accordance with the result of judgement in said judging step.

22. An image processing method according to claim 20, wherein said quantizing step further includes changing an area to which the error value is distributed in accordance with the result of discrimination performed in said discriminating step.

23. An image processing apparatus comprising:
input means for inputting image data;
means for producing a plurality of parameters from a region consisting of a plurality of input image data; and
judging means for judging how closely the region matches character image or halftone image, wherein a matching degree corresponds to one of a plurality of different areas the region falls within based on a correlation of the plurality of parameters, and at least two of the different areas correspond to degrees that indicate the region is a character image.

24. An image process apparatus according to claim 23, wherein the plurality of parameters includes a first parameter equal to a variation amount of a level of the image data in the region, and a second parameter representative of whether the level of the image data in the region is closer to a predetermined first level or to a predetermined second level which is lower than the first level.

25. An image processing apparatus according to claim 24, wherein said means for producing the plurality of parameters uses a difference between a maximum value and a minimum value of the image data in the region as the first parameter, and uses a difference between a predetermined threshold and the maximum value, or a difference between the threshold and the minimum value, whichever difference has a larger absolute value, as the second parameter.

26. An image processing apparatus comprising:
input means for inputting multi-value image data;
means for producing at least one parameter from a region consisting of a plurality of input multi-value image data;
discriminating means for discriminating at least one of two attributes of the region, which attributes are, respectively, character image and halftone image, in accordance with the at least one parameter; and
conversion means for converting a tone of the multi-value image data input by said input means in accordance with a result of discrimination performed by said discriminating means.

27. An image processing apparatus according to claim 26, wherein said discriminating means discriminates whether the region is a character image or a halftone image, and further the degree to which the region is the character image or the halftone image.

28. An image processing apparatus according to claim 26, wherein the at least one parameter includes a first parameter equal to a variation amount of a level of the multi-value image data in the region, and a second parameter representative of whether the level of the multi-value image data in the region is closer to a predetermined first level or to a predetermined second level which is lower than the first level.

29. An image processing apparatus according to claim 25, wherein said means for producing the at least one parameter uses a difference between a maximum value and a minimum value of the multi-value image data in the region as the first parameter, and uses a difference between a predetermined threshold and the maximum value, or a difference between the threshold and the minimum value, whichever difference has a larger absolute value, as the second parameter.

30. An image processing apparatus according to claim 26, wherein said discriminating means further discriminates attribute of the region, which attribute is both of the character image and the halftone image.

31. An image processing apparatus according to claim 26, wherein said conversion means converts the tone by using one of a plurality of tone correction tables stored in a storage medium based on the attribute discriminated by said discriminating means.

32. An image processing method comprising the steps of:
inputting image data;
producing a plurality of parameters from a region consisting of a plurality of input image data; and
judging means for judging how closely the region matches character image or halftone image, wherein a matching degree corresponds to one of a plurality of different areas the region falls within based on a correlation of the plurality of parameters, and at least two of the different areas correspond to degrees that indicate the region is a character image.

33. An image processing method according to claim 32, wherein the plurality of parameters includes a first parameter equal to a variation amount of a level of the image data in the region, and a second parameter representative of whether the level of the image data in the region is closer to a predetermined first level or to a predetermined second level which is lower than the first level.

34. An image processing method according to claim 33, wherein said producing step includes using a difference between a maximum value and a minimum value of the image data in the region as the first parameter, and using a difference between a predetermined threshold and the maximum value, or a difference between the threshold and the minimum value, whichever difference has a larger absolute value, as the second parameter.

35. An image processing method comprising the steps of:
inputting multi-value image data;
producing at least one parameter from a region consisting of a plurality of input multi-value image data;
discriminating one of two attributes of the region, which attributes are, respectively, character image and halftone image, in accordance with the at least one parameter; and
converting a tone of the multi-value image data input in said inputting step in accordance with a result of discrimination performed in said discriminating step.

36. An image processing method according to claim 35, wherein the at least one parameter includes a first parameter equal to a variation amount of a level of the multi-value image data in the region, and a second parameter representative of whether the level of the multi-value image data in the region is closer to a predetermined first level or to a predetermined second level which is lower than the first level.

37. An image processing method according to claim 36, wherein said producing step includes using a difference between a maximum value and a minimum value of the multi-value image data in the region as the first parameter, and using a difference between a predetermined threshold and the maximum value, or a difference between the threshold and the minimum value, whichever difference has a larger absolute value, as the second parameter.

38. An image processing method according to claim 35, wherein said discriminating step includes discriminating whether the region is the character image or the halftone image, and further the degree to which the region is the character image or the halftone image.

39. An image processing method according to claim 35, wherein said discriminating step includes discriminating attribute of the region, which attribute is both of the character image and the halftone image.

40. An image processing method according to claim 35, wherein said converting step converts the tone by using one of a plurality of tone correction tables stored in a storage medium based on the attributed discriminated in said discriminating step.

41. An image processing method comprising the steps of:
inputting image data;
producing a plurality of parameters from a region consisting of input image data for an object pixel and peripheral pixels of the object pixel;
discriminating a degree to which the region is a character image or a halftone image in accordance with the plurality of parameters, wherein the degree to which the region is a character image or a halftone image is represented by one of at least three different values;
converting a tone of the input image data in accordance with the discriminated degree; and
quantizing the image data of the object pixel converted in said converting step,
wherein said quantizing step includes specifying a parameter for use in quantization of the object pixel in accordance with a result of discrimination performed in said discriminating step.

42. An image processing method according to claim 41, wherein said quantizing step further includes discriminating an error value generated when quantizing the image data of the object pixel to the periphery.

43. An image processing method according to claim 42, wherein said quantizing step further includes changing an allotment of the error value to be distributed to the periphery in accordance with the result of distributed to the periphery in accordance with the result of discrimination performed in said discriminating step.

44. An image processing method according to claim 42, wherein said quantizing step further includes changing an area to which the error value is distributed in accordance with the result of discrimination performed in said discriminating step.

45. An image processing method according to claim 41, wherein said converting step converts the tone by using one of a plurality of tone correction tables stored in a storage medium based on the degree discriminated in said discriminating step.

46. An image processing apparatus comprising:
input means for inputting image data;
means for producing a plurality of parameters from a region consisting of input image data for an object pixel and peripheral pixels of the object pixel;
discriminating means for discriminating a degree to which the region is a character image or a halftone image in accordance with the plurality of parameters, wherein the degree to which the region is a character image or a halftone image is represented by one of at least three different values;
conversion means for converting a tone of the image data input by said input means in accordance with a result of discrimination performed by said discriminating means; and quantizing for quantizing the image data of the object pixel converted by said conversion means, wherein said quantizing means specifies a parameter for use in quantization of the object pixel in accordance with the degree discriminated by said discriminating means.

47. An image processing apparatus according to claim 46, wherein said quantizing means distributes an error value, generated when quantizing image data of the object pixel, to peripheral pixels in accordance with a weighting matrix, and binary codes the image data of the object pixel in such a manner that the density of pre-binary-coded image and the density of binary coded image coincide with each other.

48. An image processing apparatus according to claim 47, wherein said quantizing means changes an area to which the error value is distributed in accordance with the result of discrimination performed by said discriminating means so as to binary-code the image data of the object pixel.

49. An image processing apparatus according to claim 47, wherein said quantizing means changes the value of a coefficient of said weighting matrix in accordance with the result of discrimination performed by said discriminating means so as to binary-code the image data of the object pixel.

50. An image processing apparatus according to claim 46, wherein said conversion means converts the tone by using one of a plurality of tone correction tables stored in a storage medium based on the degree discriminated by said discriminating means.

* * * * *

UNITED STATES PATENT AND TRADEMARK OFFICE
CERTIFICATE OF CORRECTION

PATENT NO. : 5,787,195

DATED : July 28, 1998

INVENTOR(S): TAKUYA TSUJIMOTO ET AL.

Page 1 of 4

It is certified that error appears in the above-identified patent and that said Letters Patent is hereby corrected as shown below:

Drawing:
SHEET 8

Figure 10, "CENSITY" should read --DENSITY--.

COLUMN 4

Line 57, "6 bits" should read --6-bits--.

COLUMN 5

Line 30, "used." should read --used).--

COLUMN 6

Line 62, "third columns" should read --third column--
and "fourth columns)" should read --fourth column)--.

COLUMN 9

Line 25, "data" should read --data,--.

COLUMN 10

Line 39, "full black" should read --full-black--;
Line 44, "full" should read --full---.

UNITED STATES PATENT AND TRADEMARK OFFICE
CERTIFICATE OF CORRECTION

PATENT NO. : 5,787,195

DATED : July 28, 1998

INVENTOR(S): TAKUYA TSUJIMOTO ET AL.

It is certified that error appears in the above-identified patent and that said Letters Patent is hereby corrected as shown below:

COLUMN 13

Line 14, "moire" should read --moiré--;
Line 32, "multivalue" should read --multi-value--;
Line 52, "full black" should read --full-black--;
Line 55, "not" should read --not be--.

COLUMN 14

Line 2, "sufficient" should read --sufficient to--;
Line 66, "graph" should read --graphs--.

COLUMN 15

Line 15, "with" should read --which--.

COLUMN 16

Line 47, "has" should read --have--.

COLUMN 17

Line 16, "FIG. 1" should read --FIG. 1,--;
Line 40, 6 bits" should read --6-bits--.

UNITED STATES PATENT AND TRADEMARK OFFICE
CERTIFICATE OF CORRECTION

PATENT NO. : 5,787,195

DATED : July 28, 1998

INVENTOR(S): TAKUYA TSUJIMOTO ET AL.

It is certified that error appears in the above-identified patent and that said Letters Patent is hereby corrected as shown below:

COLUMN 19

Line 10, "from" should read --from the--;
Line 40, "particularly," should read --particularity,--.

COLUMN 20

Line 42, "therein," should read --wherein--.

COLUMN 21

Line 57, "indicates" should read --indicate--.

COLUMN 22

Line 9, "discrimination" should read --judgement--
  and "discrimi-" should read --judging--;
Line 10, "nating" should be deleted.

COLUMN 24

Line 12, "attributed" should read --attribute--.

UNITED STATES PATENT AND TRADEMARK OFFICE
CERTIFICATE OF CORRECTION

PATENT NO. : 5,787,195

DATED : July 28, 1998

INVENTOR(S): TAKUYA TSUJIMOTO ET AL.

It is certified that error appears in the above-identified patent and that said Letters Patent is hereby corrected as shown below:

COLUMN 25

Line 1, "quantizing" (first occurrence) should read --quantizing means--;
Line 13, "binary coded" should read --binary-coded--.

Signed and Sealed this

Sixth Day of April, 1999

Q. TODD DICKINSON

Attest:

Attesting Officer

Acting Commissioner of Patents and Trademarks